United States Patent
Kawano et al.

(10) Patent No.: US 10,459,924 B2
(45) Date of Patent: Oct. 29, 2019

(54) INFORMATION PROCESSING SYSTEM, INFORMATION PROCESSING METHOD, INFORMATION PROCESSING DEVICE AND COMMUNICATION TERMINAL, AND METHOD AND PROGRAM FOR CONTROLLING SAME

(71) Applicants: Hirokazu Kawano, Tokyo (JP); Kouichi Onodera, Tokyo (JP); Fumiaki Imanari, Tokyo (JP); Keito Kouda, Tokyo (JP); Naoya Kondou, Tokyo (JP)

(72) Inventors: Hirokazu Kawano, Tokyo (JP); Kouichi Onodera, Tokyo (JP); Fumiaki Imanari, Tokyo (JP); Keito Kouda, Tokyo (JP); Naoya Kondou, Tokyo (JP)

(73) Assignee: NEC Corporation, Tokyo (JP)

( * ) Notice: Subject to any disclaimer, the term of this patent is extended or adjusted under 35 U.S.C. 154(b) by 1093 days.

(21) Appl. No.: 14/346,742

(22) PCT Filed: Sep. 24, 2012

(86) PCT No.: PCT/JP2012/074391
§ 371 (c)(1),
(2) Date: Mar. 24, 2014

(87) PCT Pub. No.: WO2013/047436
PCT Pub. Date: Apr. 4, 2013

(65) Prior Publication Data
US 2014/0236967 A1    Aug. 21, 2014

(30) Foreign Application Priority Data
Sep. 26, 2011 (JP) .................................. 2011-208521

(51) Int. Cl.
*G06Q 10/10* (2012.01)
*G06Q 30/02* (2012.01)
(Continued)

(52) U.S. Cl.
CPC .... *G06F 16/24578* (2019.01); *G06F 16/2272* (2019.01); *G06Q 10/10* (2013.01); *G06Q 30/02* (2013.01); *G06Q 50/01* (2013.01)

(58) Field of Classification Search
CPC .......... G06F 17/3053; G06F 17/30336; G06F 16/24578; G06F 16/2272; G06Q 10/10; G06Q 30/02; G06Q 50/01
(Continued)

(56) References Cited

U.S. PATENT DOCUMENTS 7,673,327 B1 * 3/2010 Polis ................... G06F 17/3089
713/151
2005/0075097 A1    4/2005 Lehikoinen et al.
(Continued)

FOREIGN PATENT DOCUMENTS

JP    2007-272485    10/2007
JP    2010-049633    3/2010
(Continued)

OTHER PUBLICATIONS

International Search Report corresponding to International Application No. PCT/JP2012/074391, dated Nov. 13, 2012, 2 pages.
(Continued)

*Primary Examiner* — Robert W Beausoliel, Jr.
*Assistant Examiner* — Pedro J Santos
(74) *Attorney, Agent, or Firm* — Wilmer Cutler Pickering Hale and Dorr LLP

(57) ABSTRACT

An information processing device assists generation of social communication, based on user communication information exchanged through a network. The information pro-
(Continued)

cessing device includes: a communication information collection unit that collects the communication information; a life log information extraction unit that extracts life log information included in the collected communication information; a life log information storage unit that stores the extracted life log information in a configuration capable of being searched at least on an individual user unit basis, the life log information storage unit memorizing scores of a plurality of indexes while associating the scores with the life log information, the indexes indicating degrees of contribution of the life log information to new social communication generation; and a life log information management unit that manages the life log information stored in the life log information storage unit, based on a combination of the scores of the indexes.

28 Claims, 34 Drawing Sheets

(51) Int. Cl.
  *G06F 16/2457* (2019.01)
  *G06F 16/22* (2019.01)
  *G06Q 50/00* (2012.01)
(58) Field of Classification Search
  USPC .......................................................... 707/748
  See application file for complete search history.

(56) References Cited

U.S. PATENT DOCUMENTS

| 2006/0059141 | A1* | 3/2006 | Yonezawa | G06F 17/30864 |
| 2010/0169364 | A1* | 7/2010 | Hardt | G06F 17/30861 |
| | | | | 707/769 |
| 2010/0203876 | A1* | 8/2010 | Krishnaswamy | G06Q 30/02 |
| | | | | 455/418 |
| 2011/0167071 | A1* | 7/2011 | Yang | G06Q 30/02 |
| | | | | 707/741 |
| 2011/0179378 | A1* | 7/2011 | Wheeler | G06F 17/3089 |
| | | | | 715/780 |
| 2011/0214147 | A1* | 9/2011 | Kashyap | G11B 27/105 |
| | | | | 725/46 |
| 2011/0231408 | A1* | 9/2011 | Sasaki | G06F 21/6245 |
| | | | | 707/748 |
| 2011/0320373 | A1* | 12/2011 | Lee | G06Q 50/01 |
| | | | | 705/319 |
| 2012/0016817 | A1* | 1/2012 | Smith | G06N 99/005 |
| | | | | 706/12 |
| 2012/0110071 | A1* | 5/2012 | Zhou | G06Q 10/10 |
| | | | | 709/204 |
| 2012/0271691 | A1* | 10/2012 | Hammad | G06Q 10/10 |
| | | | | 705/14.17 |
| 2012/0284080 | A1* | 11/2012 | De Oliveira | G06Q 10/04 |
| | | | | 705/7.29 |
| 2012/0316962 | A1* | 12/2012 | Rathod | G06F 17/30861 |
| | | | | 705/14.54 |
| 2014/0012593 | A1* | 1/2014 | Kim | G06F 19/345 |
| | | | | 705/2 |
| 2014/0052764 | A1* | 2/2014 | Michael | G06F 17/30221 |
| | | | | 707/822 |
| 2014/0129942 | A1* | 5/2014 | Rathod | H04N 21/44222 |
| | | | | 715/720 |
| 2014/0207518 | A1* | 7/2014 | Kannan | G06Q 30/0201 |
| | | | | 705/7.29 |
| 2016/0350505 | A1* | 12/2016 | Cho | G06F 19/3437 |

FOREIGN PATENT DOCUMENTS

| JP | 2010-152477 | 7/2010 |
| JP | 2010-266959 | 11/2010 |

OTHER PUBLICATIONS

Japanese Office Action with partial translation corresponding to Japanese Application No, 2013-536263, dated Sep. 1, 2015, 4 pages.

* cited by examiner

FIG. 5A
215-1

| USER ID | LIFE LOG INFORMATION | NUMBER OF OCCURRENCES | OCCURRENCE FREQUENCY | CHARACTERISTIC DEGREE | LAST OCCURRENCE DATE | PERIOD/ TIME OF DAY | STORAGE PERIOD | GEOGRAPHICAL CHARACTERISTIC | ... |
|---|---|---|---|---|---|---|---|---|---|
| U0001 | RADIATION (KEYWORD) | | | | | | | | |
| | NADESHIKO (KEYWORD) | | | | | | | | |
| | SUSHI (KEYWORD) | | | | | | | | |
| | ... | | | | | | | | |
| | SHIBUYA (ACTION) | | | | | | | | |
| | XX STORE (ACTION) | | | | | | | | |
| | ... | | | | | | | | |
| | CHILD (IMAGE) | | | | | | | | |
| | ... | | | | | | | | |
| | WAVE (AUDIO) | | | | | | | | |
| U0002 | SMC (KEYWORD) | | | | | | | | |
| | HAWAII (ACTION) | | | | | | | | |
| | M. J. (IMAGE) | | | | | | | | |
| | JAZZ (AUDIO) | | | | | | | | |
| | ... | | | | | | | | |
| ... | | | | | | | | | |

| 521 LIFE LOG INFORMATION | 522 NUMBER OF OCCURRENCES | 523 OCCURRENCE FREQUENCY | 524 CHARACTERISTIC DEGREE | 525 LAST OCCURRENCE DATE | 526 PERIOD/ TIME OF DAY | 527 STORAGE PERIOD | 528 GEOGRAPHICAL CHARACTERISTIC | ... |
|---|---|---|---|---|---|---|---|---|
| RADIATION (KEYWORD) | | | | | | | | |
| NADESHIKO (KEYWORD) | | | | | | | | |
| SUSHI (KEYWORD) | | | | | | | | |
| DOLPHIN (IMAGE) | | | | | | | | |
| ... | | | | | | | | |

FIG. 6A

| USER ID | FIRST LIFE LOG INFORMATION | SECOND LIFE LOG INFORMATION | ... | n-th LIFE LOG INFORMATION | FIRST PREFERENCE ANALYSIS RESULT | SECOND PREFERENCE ANALYSIS RESULT | ... |
|---|---|---|---|---|---|---|---|
| U0001 | TARO (IMAGE) | CAR NAME (KEYWORD) | | | CHILD | CAR | |
| U0002 | AIR TICKET (KEYWORD) | TICKET (KEYWORD) | | | OVERSEAS TRIP | CONCERT | |
| ... | | | | | | | |

FIG. 6B

| | 621 | 622 | 623 | 624 | 625 | ... | 626 | 627 | ... | 628 | 629 |
|---|---|---|---|---|---|---|---|---|---|---|---|
| | PREFERENCE ANALYSIS RESULT | GENDER | AGE | FIRST GUIDANCE INFORMATION | SECOND GUIDANCE INFORMATION | ... | FIRST ADVERTISING INFORMATION | SECOND ADVERTISING INFORMATION | ... | FIRST LIFE LOG INFORMATION | SECOND LIFE LOG INFORMATION |
| | CHILD | | | XX HOUSE | CAMPING | | ANIMATION FILM | CHILDREN'S CLOTHES | | GROWTH (KEYWORD) | EXPERIENCE (KEYWORD) |
| | OVERSEAS TRIP | | | TRAVEL LIMITATION | EVENT | | TOUR | CHEAP AIRFARE | | SEA (IMAGE) | EATING (KEYWORD) |
| | ... | | | | | | | | | | |

Figure 7A:
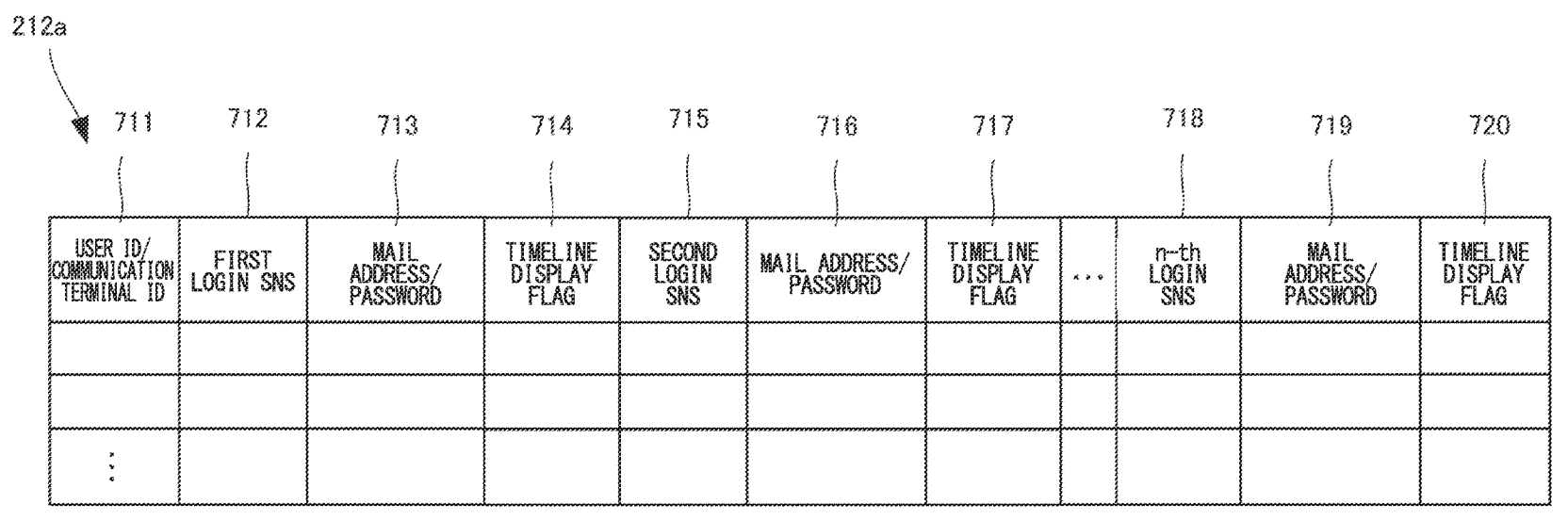

| 711 USER ID/ COMMUNICATION TERMINAL ID | 712 FIRST LOGIN SNS | 713 MAIL ADDRESS/ PASSWORD | 714 TIMELINE DISPLAY FLAG | 715 SECOND LOGIN SNS | 716 MAIL ADDRESS/ PASSWORD | 717 TIMELINE DISPLAY FLAG | ... | 718 n-th LOGIN SNS | 719 MAIL ADDRESS/ PASSWORD | 720 TIMELINE DISPLAY FLAG |
|---|---|---|---|---|---|---|---|---|---|---|
| ... | | | | | | | | | | |
| | | | | | | | | | | |
| | | | | | | | | | | |

212a

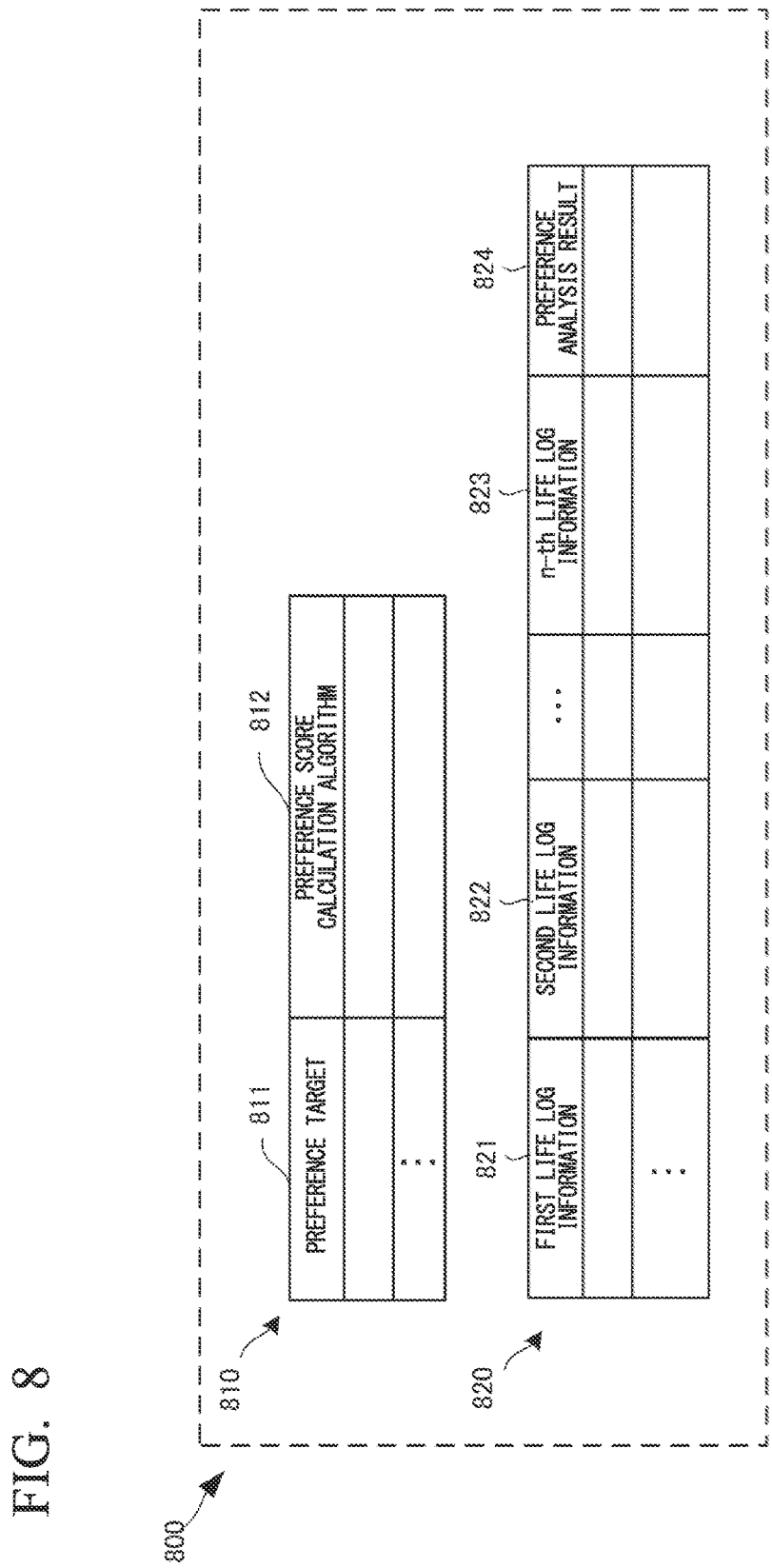

FIG. 9

| 901 DELETION CONDITION | 902 THRESHOLD VALUE | 903 DELETION AMOUNT (OR STORAGE AMOUNT) |
|---|---|---|
| NUMBER OF USER LIFE LOG INFORMATION | NTh | V1/NUMBER OF USER MEMORIES |
| NUMBER OF ALL LIFE LOG INFORMATION | MTh | V2/NUMBER OF ALL MEMORIES |
| LIFE LOG INFORMATION DATA AMOUNT | QTh | V3/ALL MEMORY AMOUNT |
| PROCESS TIME | TTh | V4/NUMBER OF ALL MEMORIES (AMOUNT) |
| ... | | |

FIG. 20

| USER PREFERENCE TARGET | SELECTED GUIDANCE/ ADVERTISING INFORMATION | FIRST ATTACHMENT CANDIDATE LIFE LOG INFORMATION | SECOND ATTACHMENT CANDIDATE LIFE LOG INFORMATION | ... |
|---|---|---|---|---|
| CAR | NEW CAR ADVERTISEMENT | ENVIRONMENT (KEYWORD) | SPACE (KEYWORD) | |
| GOURMET (DESSERT) | CAKE BUFFET | CHEAP (KEYWORD) | EXCEPTIONAL (KEYWORD) | |
| AKB48 | | | | |
| VOLUNTEER | | | | |
| ... | | | | |

| SNS 2501 | INDEX WEIGHTING CHANGE 2502 | LIFE LOG INFORMATION WEIGHTING CHANGE 2503 |
|---|---|---|
| FIRST SNS | NUMBER $\times (1-\alpha 1)$ | $1-\beta 1$ |
| SECOND SNS | NUMBER $\times (1+\alpha 2)$ | $1+\beta 2$ |
| ... | | |
| n-th SNS | | |
| OTHER NETWORKS | | |

2500

INFORMATION PROCESSING SYSTEM, INFORMATION PROCESSING METHOD, INFORMATION PROCESSING DEVICE AND COMMUNICATION TERMINAL, AND METHOD AND PROGRAM FOR CONTROLLING SAME

CROSS-REFERENCE TO RELATED APPLICATIONS

This application is a national stage application of International Application No. PCT/JP2012/074391 entitled "Information Processing System, Information Processing Method, Information Processing Device and Communication Terminal, and Method and Program for Controlling Same," filed on Sep. 24, 2012, which claims the benefit of the priority of Japanese Patent Application No. 2011-208521, filed on Sep. 26, 2011, the disclosures of each of which are hereby incorporated by reference in their entirety.

TECHNICAL FIELD

The present invention relates to a technique for supporting generation of social communication based on user communication information through a network.

BACKGROUND ART

In the above technical field, in Patent Document 1, by means of a service providing server, text data is obtained from communication performed between user terminal devices, and by analyzing the text, whether a noun in the text is positively used or negatively used is registered. Thereby, services based on user preference are provided.

PRIOR ART DOCUMENT

Patent Document

[Patent Document 1] Japanese Unexamined Patent Application, First Publication No. 2010-049633

SUMMARY OF THE INVENTION

Problem to be Solved by the Invention

However, the technique disclosed in Patent Document 1 only shows nouns that are extracted from sentence data or a configuration of information that is categorized for preference determination. In the technique disclosed in Patent Document 1, no information memory management measure such as generation, alteration, and deletion is found in an information memory unit that memorizes this type of information. Therefore, Patent Document 1 illustrates no memory structure for appropriate memory management of communication information, which is obtained in a large amount.

An exemplary an object of the present invention is to provide a technique for solving the problem mentioned above.

Means for Solving the Problem

In order to achieve the above object, an information processing device according to a first exemplary aspect of the present invention assists generation of social communication, based on user communication information exchanged through a network. The information processing device includes: a communication information collection unit that collects the communication information; a life log information extraction unit that extracts life log information included in the collected communication information; a life log information storage unit that stores the extracted life log information in a configuration capable of being searched at least on an individual user unit basis, the life log information storage unit memorizing scores of a plurality of indexes while associating the scores with the life log information, the indexes indicating degrees of contribution of the life log information to new social communication generation; and a life log information management unit that manages the life log information stored in the life log information storage unit, based on a combination of the scores of the indexes.

In order to achieve the above object, a control method of an information processing device according to a second aspect of the present invention assists generation of social communication, based on user communication information exchanged through a network. The control method includes: collecting the communication information; extracting life log information included in the collected communication information; storing the extracted life log information in a life log information storage unit in a configuration capable of being searched at least on an individual user unit basis, and memorizing scores of a plurality of indexes in the life log information storage unit while associating the scores with the life log information, the indexes indicating degrees of contribution of the life log information to new social communication generation; and managing the life log information stored in the life log information storage unit, based on a combination of the scores of the indexes.

In order to achieve the above object, a control program of an information processing device according to a third aspect of the present invention assists generation of social communication, based on user communication information exchanged through a network. The control program causes a computer to execute: collecting the communication information; extracting life log information included in the collected communication information; storing the extracted life log information in a life log information storage unit in a configuration capable of being searched at least on an individual user unit basis, and memorizing scores of a plurality of indexes in the life log information storage unit while associating the scores with the life log information, the indexes indicating degrees of contribution of the life log information to new social communication generation; and managing the life log information stored in the life log information storage unit, based on a combination of the scores of the indexes.

In order to achieve the above object, a communication terminal according to a fourth aspect of the present invention transmits the communication information to the above-described information processing device. The communication terminal includes: a timeline creation unit that sorts in chronological order communication information exchanged through a plurality of social networking services, and creates single timeline information; and a communication information retention unit that retains the communication information of a predetermined period to be transmitted to the information processing device.

In order to achieve the above object, a control method of a communication terminal according to a fifth aspect of the present invention transmits the communication information to the above-described information processing device. The control method includes: sorting in chronological order communication information exchanged through a plurality of social networking services, and creates single timeline information; and retaining the communication information of a predetermined period to be transmitted to the information processing device.

In order to achieve the above object, a control program of a communication terminal according to a sixth aspect of the present invention transmits the communication information to the above-described information processing device. The control program causes a computer to execute: sorting in chronological order communication information exchanged through a plurality of social networking services, and creates single timeline information; and retaining the communication information of a predetermined period to be transmitted to the information processing device.

In order to achieve the above object, an information processing system according to a seventh aspect of the present invention assists generation of social communication, based on user communication information exchanged through a network The information processing system includes: a communication information collection unit that collects the communication information; a life log information extraction unit that extracts life log information included in the collected communication information; a life log information storage unit that stores the extracted life log information in a configuration capable of being searched at least on an individual user unit basis, the life log information storage unit memorizing scores of a plurality of indexes while associating the scores with the life log information, the indexes indicating degrees of contribution of the life log information to new social communication generation; a life log information management unit that manages the life log information stored in the life log information storage unit, based on a combination of the scores of the indexes; and an information provision unit that selects guidance information or advertising information to be provided to a predetermined user, using the stored life log information and the scores of the indexes, and provides the selected guidance information or advertising information through a communication terminal being used by the predetermined user.

In order to achieve the above object, an information processing method according to an eighth aspect of the present invention assists generation of social communication, based on user communication information exchanged through a network. The information processing method includes: collecting the communication information; extracting life log information included in the collected communication information; storing the extracted life log information in a life log information storage unit in a configuration capable of being searched at least on an individual user unit basis, and memorizing scores of a plurality of indexes in the life log information storage unit while associating the scores with the life log information, the indexes indicating degrees of contribution of the life log information to new social communication generation; managing the life log information stored in the life log information storage unit, based on a combination of the scores of the indexes; and selecting guidance information or advertising information to be provided to a predetermined user, using the stored life log information and the scores of the indexes, and providing the selected guidance information or advertising information through a communication terminal being used by the predetermined user.

Effect of the Invention

According to the present invention, communication information that is obtained in a large amount can be appropriately memorized and managed.

BRIEF DESCRIPTION OF THE DRAWINGS

FIG. 5A shows a configuration of a life log information database for each user according to the second exemplary embodiment of the present invention.

FIG. 5B shows a configuration of an entire life log information database according to the second exemplary embodiment of the present invention.

FIG. 6A shows a configuration of a user preference DB according to the second exemplary embodiment of the present invention.

FIG. 6B shows a configuration of a guidance/advertising information DB according to the second exemplary embodiment of the present invention.

FIG. 7A shows a configuration of a target SNS table according to the second exemplary embodiment of the present invention.

FIG. 8 shows a configuration of a user preference algorithm according to the second exemplary embodiment of the present invention.

FIG. 9 shows a configuration of a life log information deletion condition table according to the second exemplary embodiment of the present invention.

FIG. 20 shows a configuration of an additional life log information table according to the third exemplary embodiment of the present invention.

FIG. 25 shows a configuration of a SNS weighting table according to a fourth exemplary embodiment of the present invention.

EMBODIMENTS FOR CARRYING OUT THE INVENTION

Hereunder, exemplified descriptions of exemplary embodiments of the present invention are given in detail, with reference to the drawings. However, constituents disclosed in the following exemplary embodiments are examples only, and the technical scope of the present invention is not limited by them.

[First Exemplary Embodiment]

Figure 1:
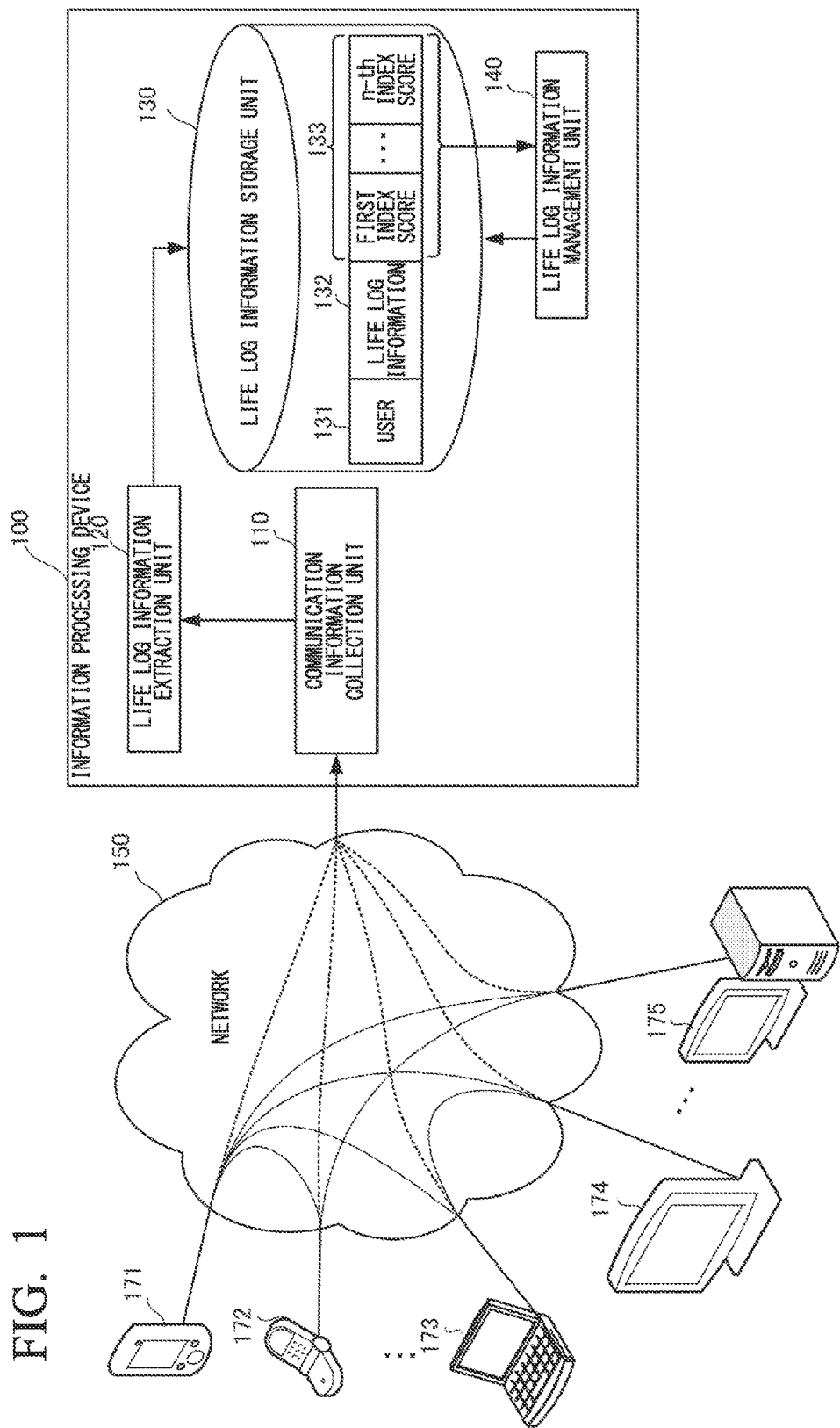
FIG. 1 is a block diagram showing a configuration of an information processing device according to a first exemplary embodiment of the present invention.

An information processing device 100 according to a first exemplary embodiment of the present invention is described, with reference to FIG. 1. The information processing device 100 assists generation of social communication, based on user communication information of users 171 to 175 exchanged through a network 150.

As shown in FIG. 1, the information processing device 100 includes a communication information collection unit 110, a life log information extraction unit 120, a life log information storage unit 130, and a life log information management unit 140. The communication information collection unit 110 collects communication information of unspecified users 171 to 175 exchanged through the network 150. The life log information extraction unit 120 extracts life log information contained in the collected communication information. The life log information storage unit 130 stores the extracted life log information 132 in a configuration that can at least be searched on a user 131 unit basis. Meanwhile, the life log information storage unit 130 memorizes scores 133 of several indexes that indicate degrees of contribution of the life log information 132 to new social communication generation, while associating them with the life log information 132. The life log information management unit 140 manages the life log information 132 stored in the life log information storage unit 130, based on a combination of the scores 133 of the several indexes.

According to the present exemplary embodiment, communication information that is obtained in a large amount can be appropriately memorized and managed.

[Second Exemplary Embodiment]

Next, an information processing system according to a second exemplary embodiment of the present invention is described. In the present exemplary embodiment, an information processing device that functions as a social communication server (hereunder, referred to as SC server) collects user communication information from network communication including several social networking services (hereunder, referred to as SNS). This information processing device displays the collected communication information of the several SNSs as single timeline information, and extracts life log information from the communication information, to thereby perform suitable management. Life log information for which, generation, update, and deletion is managed in an integrated manner, is used to assist generation of new social communication.

According to the present exemplary embodiment, communication information that is obtained in a large amount can be appropriately memorized and managed, while the technique for performing the memorization and management can be suitably used to assist generation of new social communication.

<<Configuration of Information Processing System>>

Figure 2:
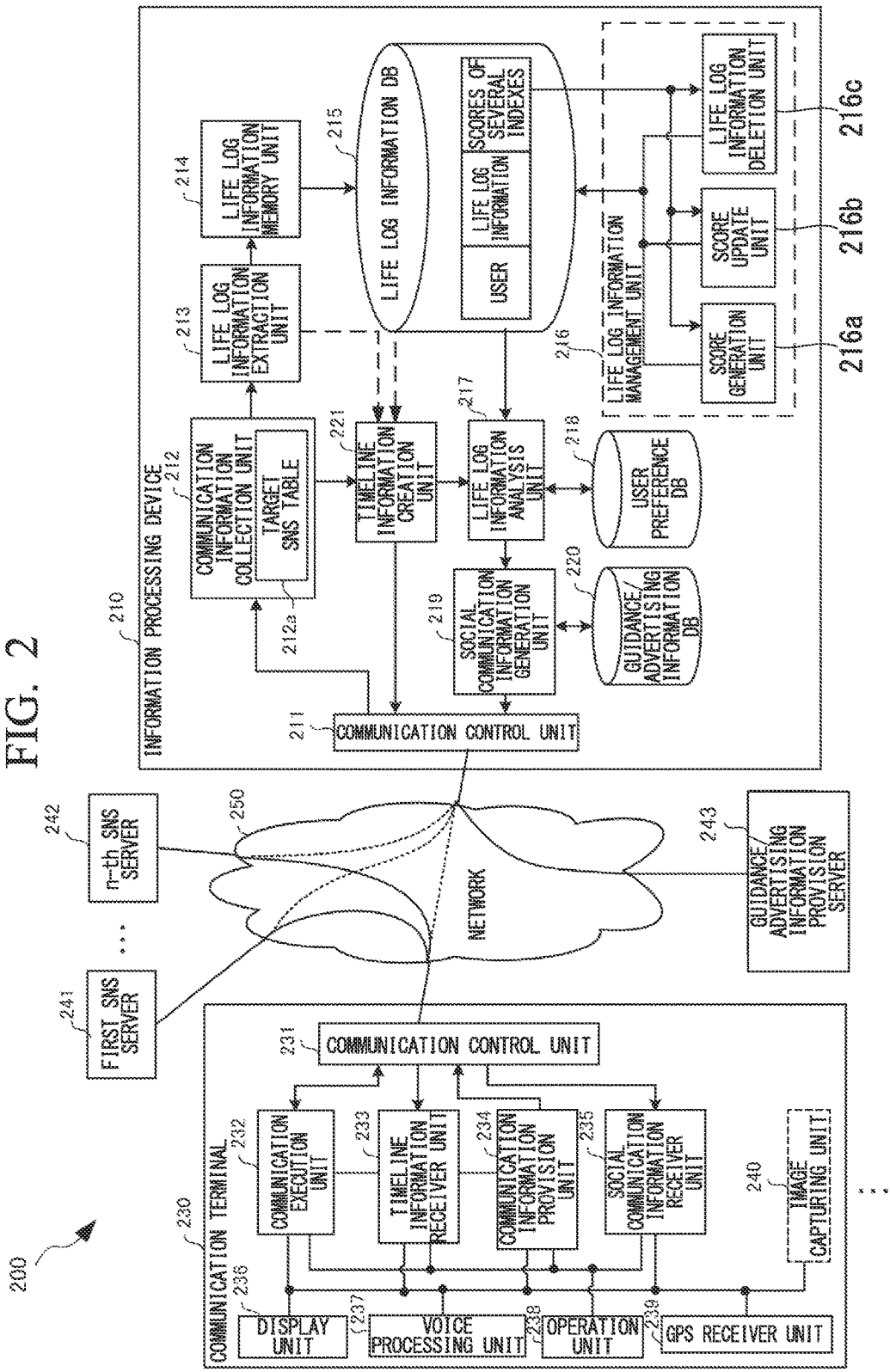
FIG. 2 is a block diagram showing a configuration of an information processing system according to a second exemplary embodiment of the present invention.

FIG. 2 is a block diagram showing a configuration of an information processing system 200 according to the present exemplary embodiment.

The information processing system 200 of FIG. 2 includes an information processing device 210 that operates as a SC server, a plurality of communication terminals 230, a plurality of SNS servers 241 and 242, and a guidance/advertising information provision server 243 which are connected to one another through a network 250. The network 250 includes several SNSs such as first SNS server 241 and n-th SNS server 242, and other network services. The SNSs include existing SNSs as well as SNSs that are scheduled to be launched in the future. The guidance/advertising information provision server 243 provides, to the information processing device 210, guidance information and/or advertising information to be announced to the communication terminals 230. The plurality of communication terminals 230 each use SNSs and other network services to exchange communication information with each other. This communication information is collected by the information processing device 210 from the SNSs or from respective communication terminals 230. In the present exemplary embodiment, the communication information includes text data such as a message and a sentence, video data such as a still picture and a motion picture, and user positional information provided from a GPS (global positioning system) and/or user behavioral information provided from positional information history.

The information processing device 210 has a communication control unit 211 for communicating with the SNS servers 241 and 242, and with a communication terminal 230 through the network 250. A communication information collection unit 212 collects user communication information that is received through the communication control unit 211 from the SNS servers 241 and 242 registered in a target SNS table 212a and/or from the communication terminal 230. The communication information collected through the several SNSs and other network services is sorted for each user in a communication time order by the timeline information creation unit 221, and is then transmitted to the communication terminal 230 being used by a user.

As shown with the dashed line arrow from a life log information database 215 to the timeline information creation unit 221, the timeline information creation unit 221 may use a life log information score of each user (refer to FIG. 5A) to create timeline information. For example, the timeline information creation unit 221 may re-sort the communication information, taking into consideration not only communication information order but also degree of user's interest. In this case, the timeline information creation unit 221 makes reference to a score in the life log information database 215 that corresponds to the collected communication information and/or the life log information that is extracted from the target SNS timeline information by the life log information extraction unit 213. The dashed line arrow from the life log information extraction unit 213 to the timeline information creation unit 221 represents this process.

The life log information extraction unit 213 extracts life log information from each communication information collected from the several SNSs and/or other network services. A life log information memory unit 214 stores the extracted life log information in the life log information database (hereunder, database is referred to as DB) 215.

When the communication information is text data such as a message and a sentence, the life log information includes keyword information contained in the message or the sentence, and usage of the keyword information. The life log information extraction unit 213 extracts keyword information and keyword information usage from a message or a sentence by means of text mining. The life log information extraction unit 213 also determines, by means of text mining, whether the keyword information is being used positively or negatively, as keyword information usage.

When the communication information is behavioral data such as user's behavior and behavioral history, the life log information includes positional information and behavioral information.

When the communication information is video data such as a still picture and a motion picture, the life log information includes image characteristic information and video characteristic information.

When storing life log information in the life log information DB 215, the life log information memory unit 214 stores the life log information in a state where it can be searched on an each-user basis, and stores the life log information in a state of including all users (refer to FIG. 5A and FIG. 5B). In the present exemplary embodiment, when storing life log information in the life log information DB 215, the life log information memory unit 214 determines whether the life log information to be stored has already been registered or it has not been registered. If the life log information to be stored has not been registered, a score generation unit 216a of a life log information management unit 216 adds, to the life log information, initial scores of several indexes that decide new social communication, and registers it (refer to FIG. 7B). If the life log information to be stored has already been registered, a score update unit 216b updates the scores of the several indexes that have been added to the life log information. A life log information deletion unit 216c of the life log information management unit 216 determines whether or not the volume of information already stored in the life log information DB 215 is approaching a storable capacity limit of the life log information DB 215. If determined to be approaching the storable capacity limit of the life log information DB 215, the life log information deletion unit 216c deletes life log information in the life log information DB 215 to create an empty area (refer to FIG. 10).

To correspond to acquisition of communication information from a user, a life log information analysis unit 217 analyzes user preference based on the life log information of each user of the life log information DB 215. The life log information analysis unit 217 stores the analyzed user preference to a user preference DB 218 (refer to FIG. 6A). A social communication information generation unit 219 obtains guidance information or advertising information received from the guidance/advertising information provision server 243 from a guidance/advertising information DB 220 that stores information so as to correspond to user preference (refer to FIG. 6B). The social communication information generation unit 219 uses the obtained information to generate social communication information as service information. To the social communication information, for example, there may be added predetermined life log information, in order to obtain useful information for generating new social communication for the user. The generated social communication information may be transmitted, to the communication terminal 230 being used by the user, in a state of having been added to timeline information. Moreover, the generated social communication information may be independently transmitted as a guidance/advertisement, to the communication terminal 230 being used by the user.

Each communication terminal 230 has a communication control unit 231 for communicating with the SNS servers 241 and 242, and with the information processing device 210 functioning as a SC server, through the network 250. Moreover, each communication terminal 230 has a communication execution unit 232, a timeline information receiver unit 233, a communication information provision unit 234, and a social communication information receiver unit 235.

The communication execution unit 232 executes data exchange, being communication with other communication terminals performed by SNSs. The timeline information receiver unit 233 receives the entire timeline information of the several SNSs and/or other communication services generated by the timeline information creation unit 221 of the information processing device 210, and displays it on a display unit 236. The communication information provision unit 234 provides, to the communication information collection unit 212 of the information processing device 210, the communication information that has been transmitted and/or received by the communication terminal 230 itself. Alternatively, the communication information provision unit 234 provides, to the information processing device 210, information that enables the information processing device 210 to obtain communication information from the SNSs (such as a password).

The social communication information receiver unit 235 receives the social communication information generated by the social communication information generation unit 219 of the information processing device 210, and displays it in a desired format at a desired position of a display unit 236. Moreover, each communication terminal 230 has a display unit 236, a voice processing unit 237, an operation unit 238, and a GPS receiver unit 239. The display unit 236 displays information including communication information, timeline information, and social communication information, and announces it to a user. The voice processing unit 237 reproduces a voice corresponding to the information displayed on the display unit 26 or downloaded music, and it has a function of collecting sound made by a user. The operation unit 238, for example, receives user's operation instructions made with various switches and a touch panel. The GPS receiver unit 239 receives signals from GPS satellites (not shown in the figure) to measure the position of the communication terminal 230, and provides the positional information as one type of communication information. Moreover, the communication terminal 230 may have an image capturing unit 240. In this case, videos including a still image and/or a motion picture captured with the image capturing unit 240 are included as attachment data in communication information.

As described above, the communication information of the communication performed between the communication terminal 230 and other communication terminals 230 through the several SNS servers 241 and 242 is collected by the information processing device 210 from the communication terminals 230 or the SNS servers 241 and 242. The life log information extracted from the communication information is stored in the life log information DB 215. The life log information management unit 216, for the stored life log information, generates and updates scores of several indexes that decide generation of new social communication, and further, it manages deletion of life log information. The life log information analysis unit 217 analyzes, based on the scores of the several indexes, the life log information in which each user is interested, and determines user preference based on the life log information. The social communication information generation unit 219 provides a guidance/advertisement that matches the user preference.

<<Operation Steps of Information Processing System>>

Figure 3:
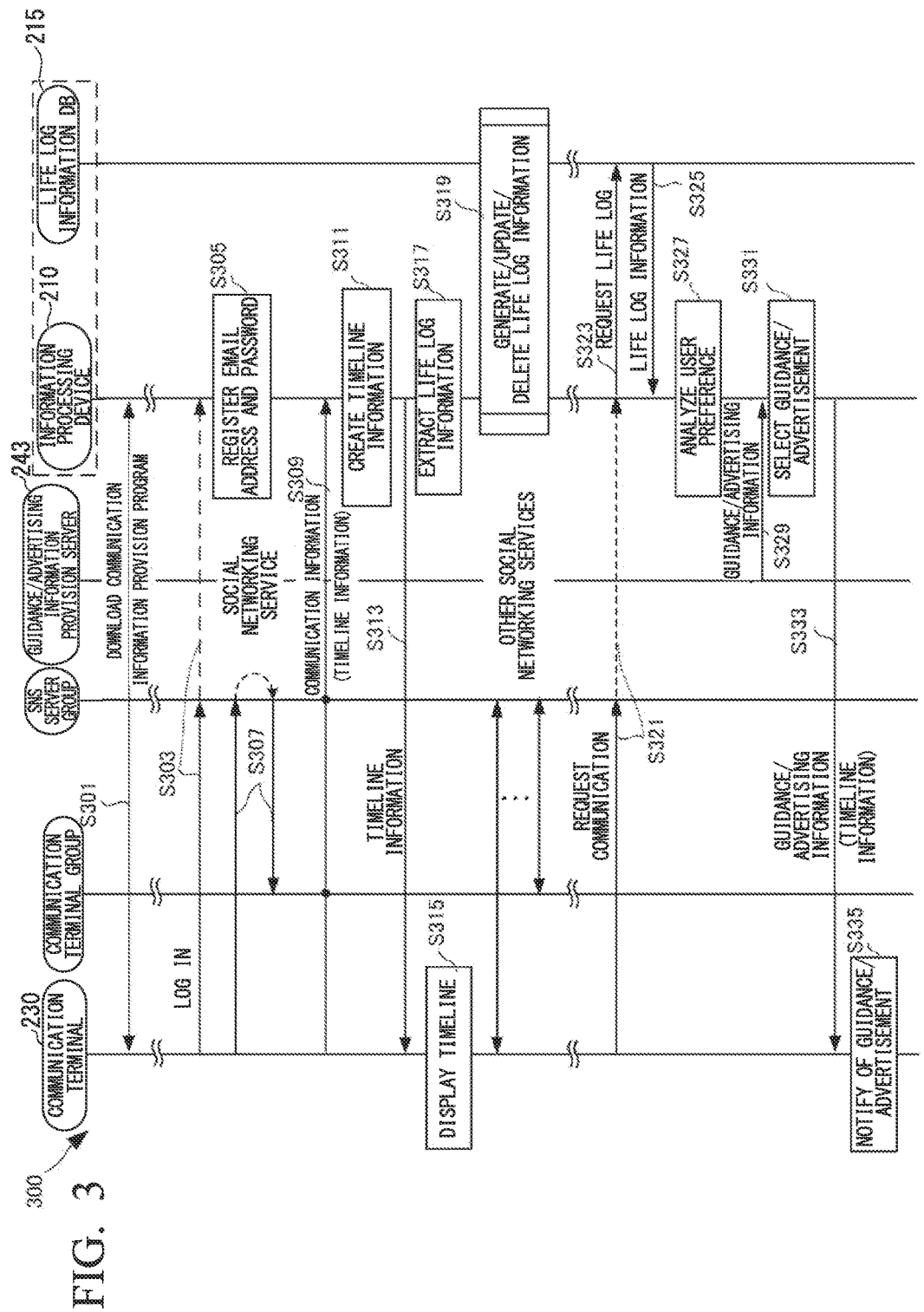
FIG. 3 is a sequence diagram showing operation steps of the information processing system according to the second exemplary embodiment of the present invention.

FIG. 3 is a sequence diagram showing operation steps 300 of the information processing system 200 according to the present exemplary embodiment. In FIG. 3, there is shown an example of operation steps in which a communication terminal 230 transmits communication information through a SNS. Operation steps in the case where the communication terminal 230 receives communication information from another communication terminal 230 are also similar to these steps. Moreover, the communication information may include not only communication information transmitted and/or received through a SNS but also communication information that can be received by the information processing device 210 serving as a SC server.

First, in step S301, the communication terminal 230 provides communication information of the communication terminal 230 to the information processing device 210, and requests from the information processing device 210, a communication information provision program that receives and displays timeline information including several SNSs. Then, the communication terminal 230 downloads the communication information provision program from the information processing device 210. If the communication information provision program is preliminarily included in the communication terminal 230, the process of step S301 is not required.

After this, in step S303, the communication terminal 230 performs logging-in to a desired SNS. At this time, an email address and a password for this logging-in are transmitted also to the information processing device 210. In step S305, the information processing device 210 registers the logged-in SNS and the received email address and password while associating them with a user ID. This registration is performed by registering the target SNS, the email address, and the password to the target SNS table 212a of the information processing device 210 (refer to FIG. 4A and FIG. 7A).

After this, a case is described where for example in step S307 the communication terminal 230 transmits communication information to a group of other communication terminals 230 through the SNS servers 241 and 242. In this case, in step S309, the information processing device 210 is notified of the communication information from the SNS servers 241 and 242 that mediated the communication or from the communication terminal 230 that transmitted and/or received the communication. In reality, timeline information of the user is obtained from the user-associated SNS registered in the target SNS table 212a. In step S311, the information processing device 210 generates timeline information of the entire registered SNSs in a chronological order, from the communication information that has just been received at this point in time and the timeline information of the target SNS. In step S313, the information processing device 210 transmits the generated timeline information to the communication terminal 230. In step S315, the display unit 236 of the communication terminal 230 displays the timeline in which the communication information of the several SNSs are arranged in chronological order. In FIG. 3, an operation of specifying timeline display (refer to the center portion and the right side portion of FIG. 4A) is omitted in order to avoid complexity.

In creation of timeline information, when making reference to the information of the life log information DB 215, creation, transmission, and displaying of the timeline information in step S311 to step S315 are executed after the life log information extraction in step S317 or after generation, updating, or deletion of the life log information in step S319.

In step S317, life log information is extracted from the new communication information. The extracted life log information is stored in the life log information DB 215 of the information processing device 210. In step S319, there are performed generation of new life log information, update of the life log information that has already been registered, and deletion of the life log information for ensuring an empty area in the life log information DB 215. The life log information DB 215 also stores communication information of other SNSs for each user or all users. This communication information is used to provide guidance information and/or advertising information as the following social communication generation.

Then, in step S321, if there is a request for communication (including communication information transmission) from the communication terminal 230, the request is transmitted to the information processing device 210. In step S323, the information processing device 210 requests the life log information DB 215 communication information on an individual user unit basis. In step S325, the life log information DB 215 transmits the communication information on an individual user unit basis to the information processing device 210. Next, in step S327, the information processing device 210 analyzes user preference based on the obtained life log information. In step S329, the guidance/advertising information provision server 243 provides guidance/advertising information to the information processing device 210. In step S331, the information processing device 210 selects a guidance/advertisement from the provided guidance/advertising information, based on the user preference. The guidance/advertising information may be preliminarily provided from the guidance/advertising information provision server 243, and may be stored in the guidance/advertising information DB 220. In step S333, the information processing device 210 notifies the communication terminal 230 of the guidance/advertising information as social communication information in an independent manner or in a manner of being embedded in the timeline information. In step S335, on the communication terminal 230, the user is notified of the received guidance/advertisement on the screen or by voice.

Steps of guidance/advertising information notification in the sequence diagram of FIG. 3 are triggered based on a communication request from the communication terminal 230 in step S321. However, the guidance/advertising information may also be sequentially push-delivered from the information processing device 210.

<<Display Screen of Communication Terminal>>

Next, an example of display screens of the communication terminal 230 that characterizes the present exemplary embodiment is described.

(At Time of Registration)

Figure 4A:
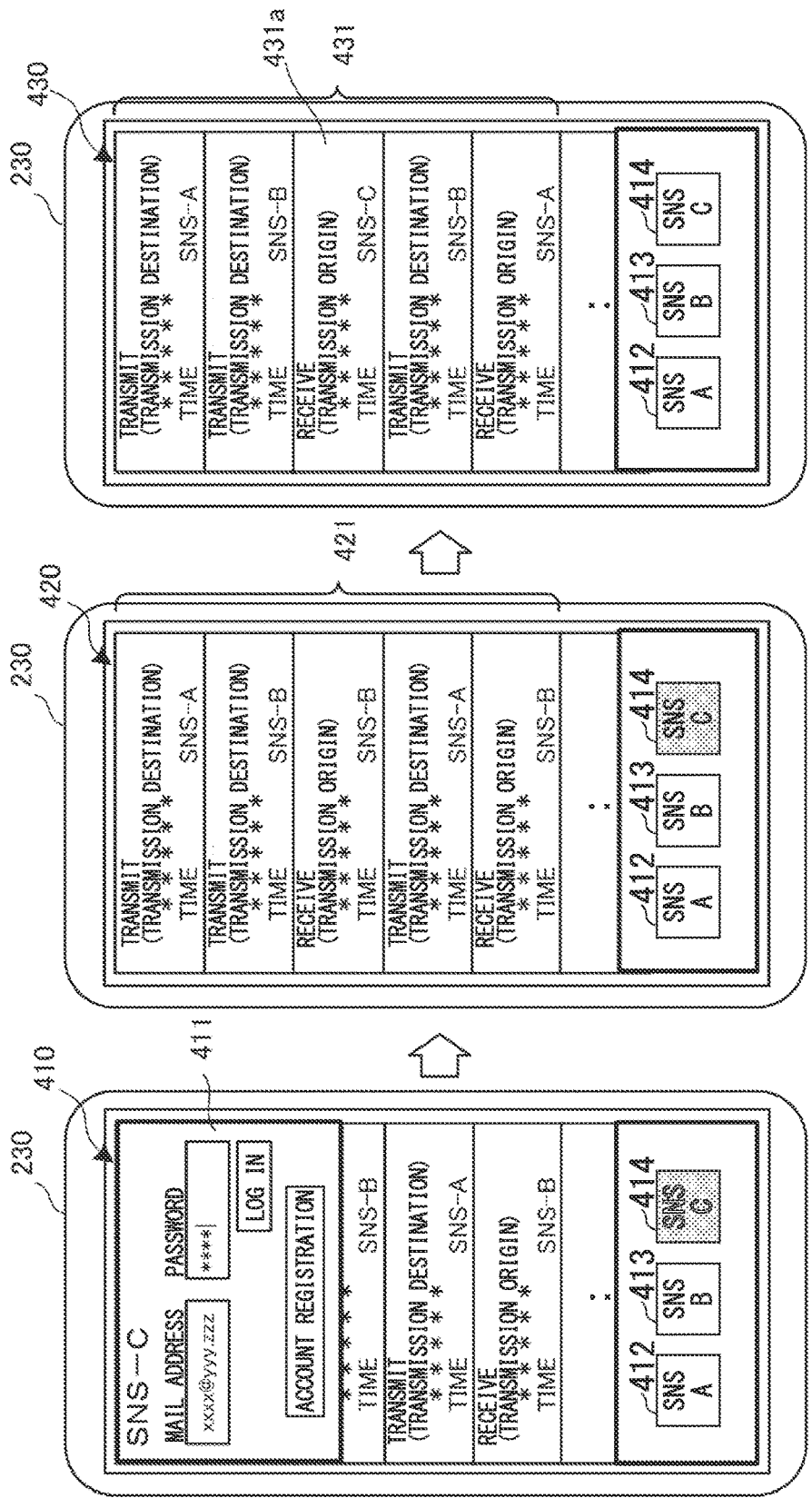
FIG. 4A shows display screen examples of a communication terminal according to the second exemplary embodiment of the present invention.

FIG. 4A shows an example of display screens of the communication terminal 230 according to the present exemplary embodiment in the case of registering communication information that should be included in timeline information. In FIG. 4A, from left to right, there are shown display screens from registering a SNS for which a common timeline is displayed, to displaying the common timeline. Operations and displays shown in FIG. 4A are merely an example, and operations and displays are not limited to these.

The left side portion of FIG. 4A shows a display screen 410 of the communication terminal 230 after the service program including the all timeline display provided by the information processing device 210 has been operated. The display screen 410 shows a state where the process of logging-in to the information processing device 210 has already been completed for a SNS-A and a SNS-B. Therefore, a SNS-A button 412 and a SNS-B button 413 are displayed brighter, and the timeline of the SNS-A and the timeline of the SNS-B are displayed in chronological order (the timeline of the SNS-A is partly hidden in the backside of a window 411). On the display screen 410, the window 411 for logging in to the SNS-C is open. Logging-in has not been processed for the SNS-C, and therefore, a SNS-C button 414 is displayed dimmed or with a reduced color.

The center portion of FIG. 4A shows a display screen 420 of the communication terminal 230 after a logging-in to the SNS-C has been instructed from the window 411 and the logging-in process has been performed for the SNS-C. On the display screen 420, the characters of the SNS-C button 414 are displayed with a strong emphasis, indicating that the user has logged in to the SNS-C. However, the SNS-C button 414 is displayed dimmed or with a reduced color, and transmission/reception information of the SNS-C is not displayed in the timeline 421.

The right side portion of FIG. 4A shows a display screen 430 of the communication terminal 230 in a state where the SNS-C button 414 has been pressed and timeline display of the SNS-C has started. On the display screen 430, the SNS-A, the SNS-B, and the SNS-C are sorted and displayed in chronological order in a common timeline 431. That is to say, a timeline 431a of the SNS-C has been added.

The above is the description of the example of display screens on the communication terminal 230 that show the steps of displaying the respective timelines of several SNSs consolidated in the common timeline.

(At Time of Notifying Guidance/Advertising)

Figure 4B:
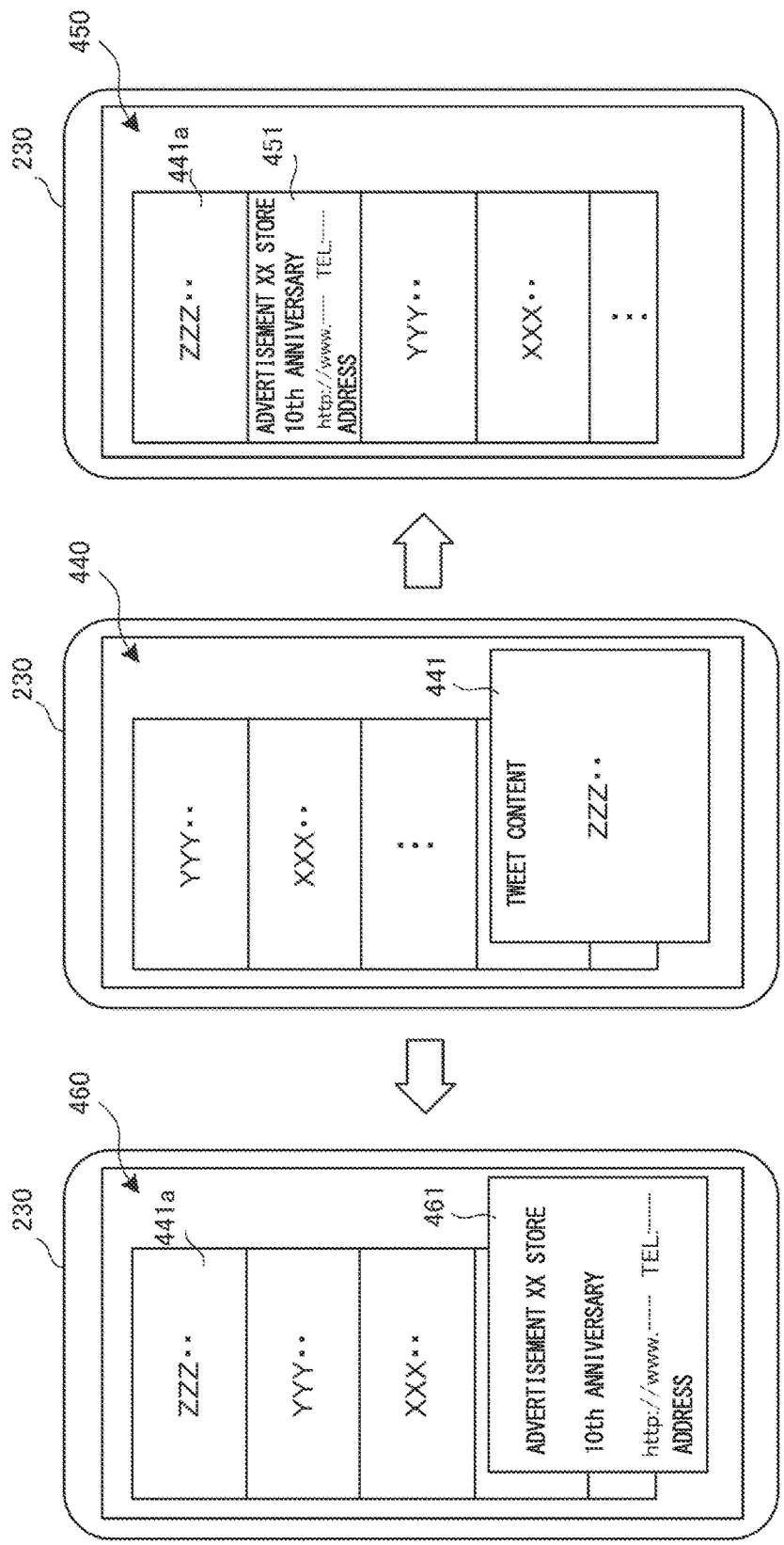
FIG. 4B shows display screen examples of the communication terminal according to the second exemplary embodiment of the present invention.

FIG. 4B shows an example of display screens of the communication terminal 230 according to the present exemplary embodiment in the case of notifying a guidance or an advertisement. In FIG. 4B, in the center portion, there is shown a display screen at the time of having input and transmitted a new tweet content. In FIG. 4B, the left side portion thereof and the right side portion thereof show two notification examples where guidance information is notified based on a user preference analysis according to time log information.

A display screen 440 of the communication terminal 230 at the center portion of FIG. 4B displays a latest element "YYY . . . " and an immediately previous element "XXX . . . ", and an element "ZZZ . . . " is being input in a new tweet content input window 441.

A display screen 450 of the communication terminal 230 shown in the right side portion of FIG. 4B displays the element "ZZZ . . . " that has been input and transmitted from the new tweet content input window 441, as a latest element 441a. At the same time, following the latest element 441a of the timeline, there is displayed guidance information 451 that has been selected according to the user preference analyzed based on the life log information.

Meanwhile, a display screen 460 of the communication terminal 230 shown in the left side portion of FIG. 4B displays the element "ZZZ . . . " that has been input and transmitted from the new tweet content input window 441, as the latest element 441a of the timeline. As a separate display from the timeline display, there is displayed the guidance information 461 that has been selected according to the user preference analyzed based on the life log information. The guidance information selected according to the user preference may be displayed at an unrestrained position at a timing completely independent from update of the timeline.

<<Storage Configuration of Information Processing Device>>

Hereunder, there is described a data memory configuration of the information processing device 210 that functions as a SC server of the present exemplary embodiment. By organizing or searching data memorized according to the data storage configuration described below, each function of the information processing device 210 is realized.

(Life Log Information DB)

FIG. 5A shows a configuration of a life log information DB 215-1 of each user according to the present exemplary embodiment. Hereunder, in the present exemplary embodiment, life log information is described in a broad classification including keyword in a message (keyword); behavior including user positional information and behavioral history (action); video characteristic amount including still image and motion picture (image); and characteristic amount of voice information including human voice, natural sound, and music (audio). A behavioral history includes check-in information at entry of, for example, a store, a museum, and a sports stadium, and it is transmitted from a communication terminal.

The life log information classification above is merely an example. Moreover, it is sufficient that life log information extracted from communication information makes a contribution as information that characterizes a user, and it is not limited to the above range. For example, the life log information may include virtual behavioral information such as information that indicates which application has been used on a communication terminal 230, and information that indicates what search keyword has been input. Furthermore, the life log information also includes user-related information such as physical information including user's body weight and blood pressure, and the number of steps taken by the user.

The life log information database 215-1 memorizes life log information 512 that has occurred in communication information for each user ID 511. In reality, the configuration may not have to be organized by the user ID 511 as shown in FIG. 5A as long as a search by user ID can be performed. A plurality of indexes that can represent the degree of contribution to social communication generation are associated with each piece of life log information 512 and memorized. The several indexes include the number of occurrences 513 of life log information; the occurrence frequency 514 that represents the number of occurrences of the life log information within a predetermined period; the characteristic degree 515 that indicates the degree of characterizing a user; and the last occurrence date 516 of the life log information. Furthermore, the several indexes include a specific period on the life log information timeline or a time of day 517, a life log information storage period 518, and a geographical characteristic 519 of life log information. Scores that represent the degree of contribution to social communication generation are given to these several indexes (for scores, refer to FIG. 7B). The degree of contribution of each piece of life log information to social communication information generation is determined based on a combination of these several indexes. The indexes are limited by the indexes shown in FIG. 5A.

A higher score is given to the characteristic degree 515, for example, in those cases where life log information that does not occur in entire recent communication information very often occurs for a specific user; life log information occurs for a specific user at a frequency far exceeding an average occurrence rate; and life log information occurs at a frequency greater than a predetermined frequency for a long period of time.

In the period/time of day 517, the period includes seasonal feelings or regular events such as Christmas. For the seasonal feelings, a higher score is given, for example, to a wording that directly expresses a season, a wording such as a season reflecting phrase of a Haiku, a seasonal function or event related to users, or an annual event. Different scores are given to the time of day, depending on whether life log information occurs in the middle of the night or early in the morning. Furthermore, different scores are given to the geographical characteristic 519, depending on the region, terrain, climate, and weather. For the period/time of day 517 and the geographical characteristic 519, a single score in which individual scores are consolidated may be treated as an index, and scores may be individually given. In the case where a single score is used in which individual scores are consolidated, there may be considered a configuration of the life log information DB 215-1 in which several child indexes are hierarchically configured under the parent indexes of the period/time of day 517 or the geographical characteristic 519.

FIG. 5B shows a configuration of an entire life log information DB 215-2 according to the present exemplary embodiment.

FIG. 5B shows a configuration of the life log information DB 215-2 in which life log information that occurs in communication information of all users or all SNSs is stored, and is not collected per user ID.

A plurality of indexes that can represent the degree of contribution to social communication generation are associated with each piece of life log information 521 and memorized in the life log information DB 215-2. The several indexes include the number of life log information occurrences 522; the occurrence frequency 523 that represents the number of life log information occurrences within a specific period of time; the characteristic degree 524 that indicates the degree of characterizing a user; the last occurrence date 525 of the life log information; the specific period on the life log information timeline or a time of day 526; the life log information storage period 527; and the geographical characteristic of the life log. Scores may be the same as those in the case of the user unit basis shown in FIG. 5A, or they may be separately defined.

There have been described the case where the several indexes are managed on the individual user unit basis shown in FIG. 5A, and the case where the several indexes are managed while treating all users in a collective manner shown in FIG. 5B. However, the several indexes may be managed on a basis of a group unit of several users. Moreover, in this example, the amount of information is large, and therefore, there is shown a configuration in which scores are updated for each piece of life log information acquisition. However, if there is a limitation on the amount of information and a sufficient amount of time for calculation, only the scores of the several indexes of each user shown in FIG. 5A may be stored, and the scores of the entirety may be calculated based on the scores of the several indexes of each user thereof (User Preference DB)

FIG. 6A shows a configuration of a user preference DB 218 according to the present exemplary embodiment. The configuration of the user preference DB 218 shown in FIG. 6A is merely an example, and it is not limited to this.

The user preference DB 218 memorizes first life log information 612, second life log information 613 to n-th life log information 614, while associating them with each user ID 611. The first life log information 612 is life log information with a highest score calculated in the life log information according to a preference score calculation algorithm (refer to FIG. 8). The second life log information 613 is life log information with a second highest score. The n-th life log information 614 is life log information with an n-th highest score. Furthermore, the user preference DB 218 memorizes a first preference analysis result 615 and a second preference analysis result 616 that have been analyzed based on a combination of the first to n-th (n is a variable) life log information (refer to FIG. 8).

(Guidance/Advertising Information DB)

FIG. 6B shows a configuration of a guidance/advertising information DB 220 according to the present exemplary embodiment. The configuration of the guidance/advertising information DB 220 shown in FIG. 6B is merely an example, and it is not limited to this.

The guidance/advertising information DB 220 memorizes first guidance information 624 and second guidance information 625 in a desired provision order, from the guidance information that is preliminarily provided by the guidance/advertising information provision server 243, while associating them with each preference analysis result 621, user gender 622, and user age 623. Moreover, the guidance/advertising information DB 220 memorizes first advertising information 626 and second advertising information 627 in a desired provision order. Furthermore, the guidance/advertising information DB 220 memorizes first life log information 628 and second life log information 629 as life log information with a high degree of contribution to social communication generation based on reactions of users to the guidance information and/or advertising information, while associating them with the preference analysis result 621, the gender 622, and the age 623. By being attached if possible to guidance information and/or advertising information, the first life log information 628 and the second life log information 629 enable a more appropriate selection process of social communication generation.

(Target SNS Table)

FIG. 7A shows a configuration of a target SNS table 212a according to the present exemplary embodiment. For each user and communication terminal, the target SNS table 212a memorizes the SNS to which the user is currently logged in. The configuration of the target SNS table 212a shown in FIG. 7A is merely an example, and it is not limited to this.

The target SNS table 212a memorizes first login SNSs 712, to which the user logged in first, mail addresses and passwords 713 for the first login SNSs 712, and timeline display flags 714 for the first login SNSs 712, while associating them with respective user IDs and communication terminal IDs 711. Moreover, the target SNS table 212a memorizes second login SNSs 715 to which the user is logged in secondly, mail addresses and passwords 716, and timeline display flags 717. Furthermore, the target SNS table 212a memorizes, in a logged-in order, n-th (n is a variable) login SNSs 718, mail addresses and passwords 719, and timeline display flags 720.

(Score Selection Table)

Figure 7B:
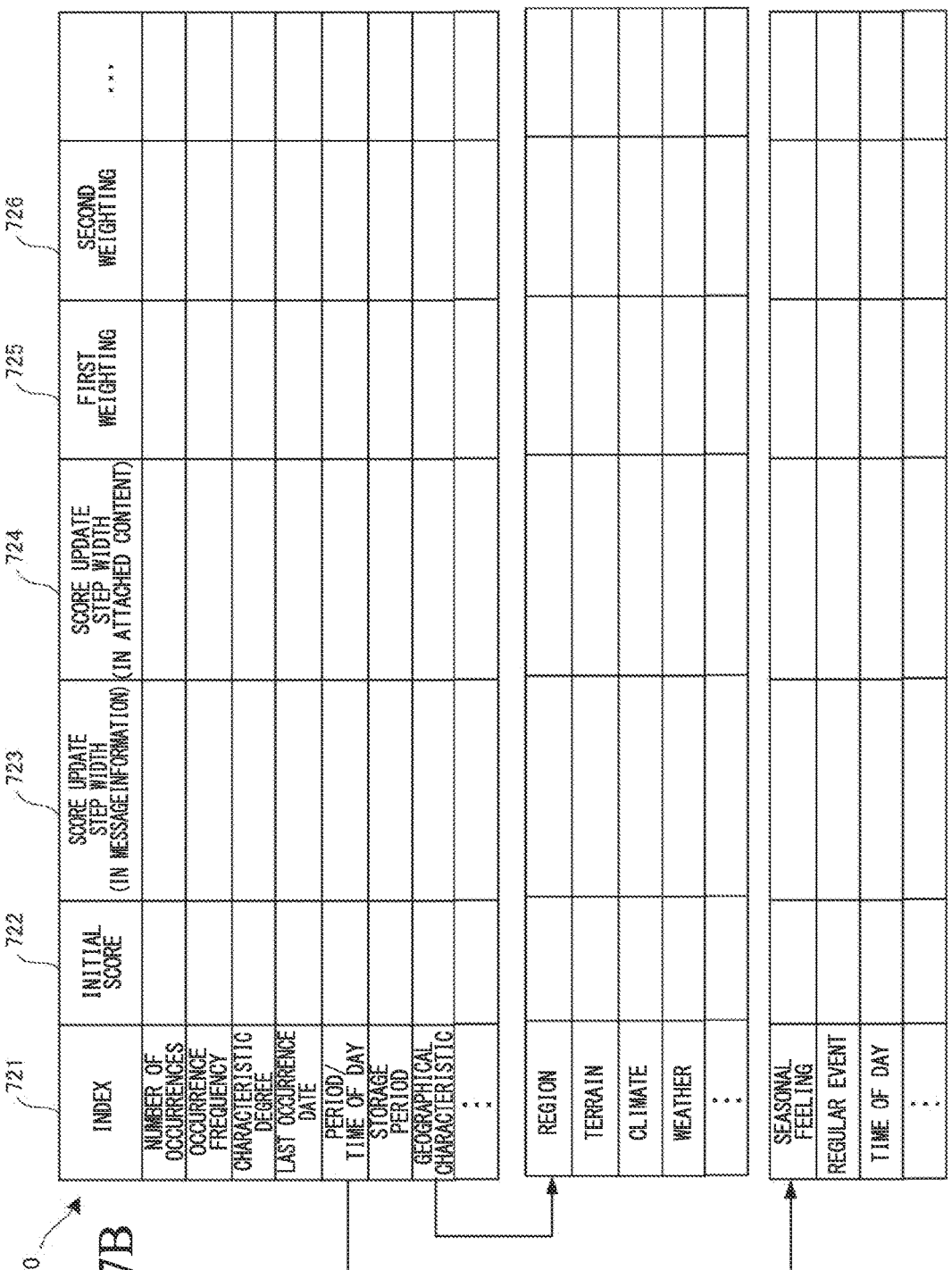
FIG. 7B shows a configuration of a score selection table according to the second exemplary embodiment of the present invention.

FIG. 7B shows a configuration of a score selection table 700 according to the present exemplary embodiment. The score selection table 700 memorizes what types of indexes are prepared and how the score of each index is managed for each piece of life log information. The configuration of the score selection table 700 of FIG. 7B shows an example of a hierarchic structure in which there are the top most several indexes in the upper portion of the diagram, and therebelow, there are indexes, which are further broken down from each index of the top most several indexes. Results of calculating the several lower indexes may be treated as upper indexes. Moreover, one lower index may also be replaced with an upper index. The configuration of FIG. 7B is merely an example, and it is not limited to this.

The score selection table 700 memorizes initial scores 722 while associating them with indexes 721 to be prepared. Moreover, the score selection table 700 memorizes score update step widths 723 in those cases where message information of the communication information contains life log information, and score update step widths 724 in those cases where an attached content contains life log information. By making the score update step width 723 and the score update step 724 different from each other, the degrees of association with user preference between the life log information contained in the message information and the life log information contained in the attached content are made different. In the case of the number of occurrences, normally, the score update step width 723 is made greater than the score update step width 724. Moreover, the score selection table 700 memorizes first weights 725 and second weights 726 in order to change weighting of the respective indexes depending on the life log information. This weighting enables finer control of the degree of contribution to social communication generation of life log information when combined with the score calculation algorithm (refer to FIG. 8 and FIG. 9).

For example, normally, the initial score 722 of the number of occurrences is "1", and it is added. Meanwhile, the initial score 722 of the last occurrence date or the storage period is a "maximum value", and it is subtracted. An initial score 722 that is not influenced by other index scores may be given to the characteristic degree and the time of day for life log information that is determined having these indexes. For example, there may be considered control in which a seasonal feeling score is maintained until the same period of the next year, and the score will be reduced if no life log information with seasonal feeling occurs when the same season of the next year arrives. For a regional score, there may be considered control in which the score is raised if life log information relates to the local area of the user, and it is lowered if the life log information relates to another area.

The score update step widths are provided for message information and for attached contents, however, it is not limited to this. The configuration may be such that the score update step width itself is changed based on a trend of the stored life log information. For example, in the case where the same life log information occurs extremely frequently, the user preference may become unclear, and therefore it may be considered to reduce the score update step width of the life log information.

(User Preference Algorithm)

FIG. 8 shows a configuration of a user preference algorithm 800 according to the present exemplary embodiment. The user preference algorithm 800 of FIG. 8 is an algorithm for determining preference of the user based on a score distribution of the life log information of each user. The configuration of the user preference algorithm 800 shown in FIG. 8 is merely an example, and it is not limited to this.

The user preference algorithm 800 has a preference score calculation algorithm table 810 and a preference analysis table 820. The preference score calculation algorithm table 810 memorizes, to correspond to a preference target 811, a preference score calculation algorithm 812 for calculating a total score based on the current scores of the several indexes of the respective pieces of life log information. If the calculation algorithm is not changed for different preference targets, the preference score calculation algorithm table 810 may memorize a single preference score calculation algorithm 812 only. The preference analysis table 820 memorizes a preference analysis result 824 so as to correspond to combinations of first life log information 821, second life log information 822 to n-th life log information 823 that are sorted in a descending order of total scores calculated according to the preference score calculation algorithm 812 based on the current score of the several indexes. It may be prepared so that a preference analysis result can be obtained without all life log information combinations matching. For example, it may be prepared so that a preference analysis result can be obtained if there is a match between the combination of life log information, and the first life log information and the third life log information.

(Life Log Information Deletion Condition Table)

FIG. 9 shows a configuration of a life log information deletion condition table 900 according to the present exemplary embodiment. The life log information deletion condition table 900 of FIG. 9 memorizes timings of deleting life log information and amounts of deletion, in order to prevent the process from being disrupted or delayed as a result of shortage of empty area in the life log information DB 215, which stores life log information. The configuration of the life log information deletion condition table 900 shown in FIG. 9 is merely an example, and it is not limited to this.

The life log information deletion condition table 900 memorizes threshold values 902 and deletion amounts (or storage amounts to be maintained) 903 of deletion conditions 901 that determine the timing of deletion, while associating them with the deletion conditions 901. In the present exemplary embodiment, as the deletion conditions

901, four conditions described below are prepared. However, the deletion conditions are not limited to these.

The first condition is the case where the number of life log information of each user stored in the life log information DB 215 exceeds a threshold value NTh. In this case, for example, only a number of memories V1 are deleted from the life log information of the user. Alternatively, only the number of memories V1 are kept from the life log information of the user, and the rest are deleted.

The second condition is the case where the number of all life log information stored in the life log information DB 215 exceeds a threshold value MTh. In this case, for example, only a number of memories V2 are deleted from all the life log information. Alternatively, only the number of memories V2 are kept from all the life log information, and the rest are deleted.

The third condition is the case where the data amount of the life log information stored in the life log information DB 215 exceeds a threshold value QTh. In this case, for example, only a number of memories V3 are deleted from all the life log information. Alternatively, only the number of memories V3 are kept from all the life log information, and the rest are deleted.

The fourth condition is the case where the amount of time taken by the process performed on the life log information stored in the life log information DB 215, by the information processing device 210 exceeds a threshold value TTh.

One of the above deletion conditions may be used, and also any combination of the conditions may be used. Moreover, determination of which life log information is to be deleted is performed based on the total score possessed by the respective pieces of life log information, and the pieces of life log information are deleted in a total score ascending order (refer to FIG. 10).

(Life Log Information Deletion Algorithm)

Figure 10:
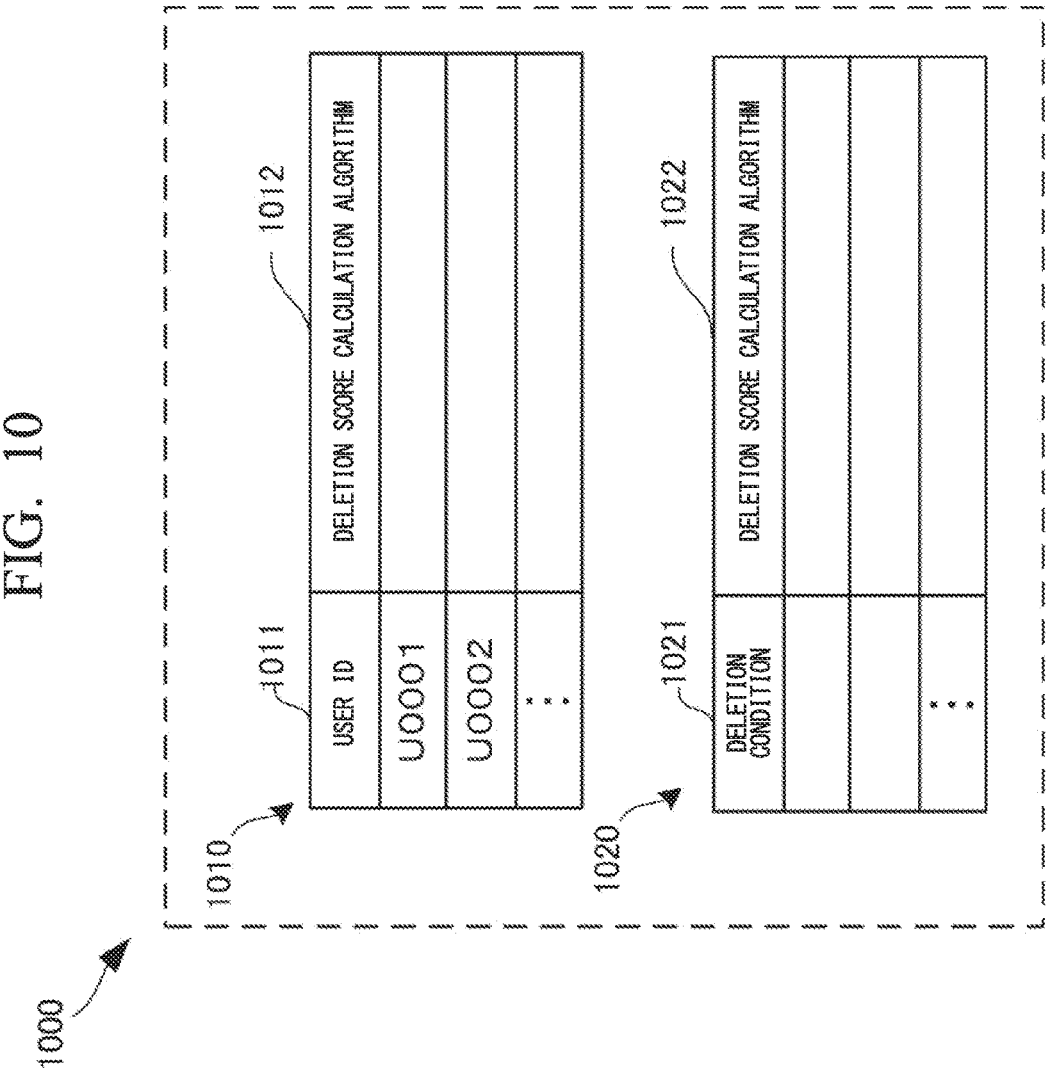
FIG. 10 shows a configuration of a life log information deletion algorithm according to the second exemplary embodiment of the present invention.

FIG. 10 shows a configuration of a life log information deletion algorithm 1000 according to the present exemplary embodiment. The life log information deletion algorithm 1000 of FIG. 10 is an algorithm for determining which life log information is to be deleted. The configuration of the life log information deletion algorithm 1000 shown in FIG. 10 is merely an example, and it is not limited to this.

The life log information deletion algorithm 1000 has a deletion score calculation algorithm table 1010 that memorizes a deletion score calculation algorithm corresponding to a user, and a deletion score calculation algorithm table 1020 that memorizes a deletion score calculation algorithm corresponding to a deletion condition. The deletion score calculation algorithm table 1010 memorizes the deletion score calculation algorithm 1012 while associating it with the user ID 1011. The deletion score calculation algorithm table 1020 memorizes the deletion score calculation algorithm 1022 while associating it with the deletion condition 1021. In the case where the deletion score calculation algorithm is not changed on the individual user unit basis or for each deletion condition, the life log information deletion algorithm 1000 may memorize the deletion score calculation algorithm only.

(Score Update Table)

Figure 11:
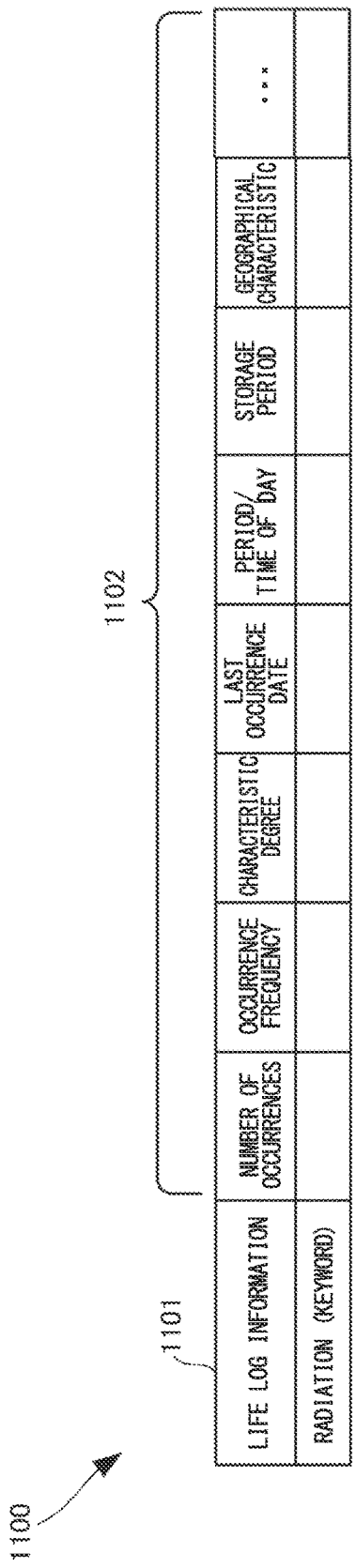
FIG. 11 shows a configuration of a score update table according to the second exemplary embodiment of the present invention.

FIG. 11 shows a configuration of a score update table 1100 according to the present exemplary embodiment. The score update table 1100 of FIG. 11 is a table that is generated when each piece of life log information occurs and if this is new life log information, and that temporarily memorizes a score of the life log information. Moreover, the score update table 1100 is a table that is read out from the life log information DB 215 when each piece of life log information occurs and if this is the life log information that has already occurred before, and that is temporarily memorized for updating the score of the life log information.

The score update table 1100 memorizes scores 1102 of the several indexes defined in FIG. 7B for each piece of life log information 1101.

(Calculation Score Table)

Figure 12:
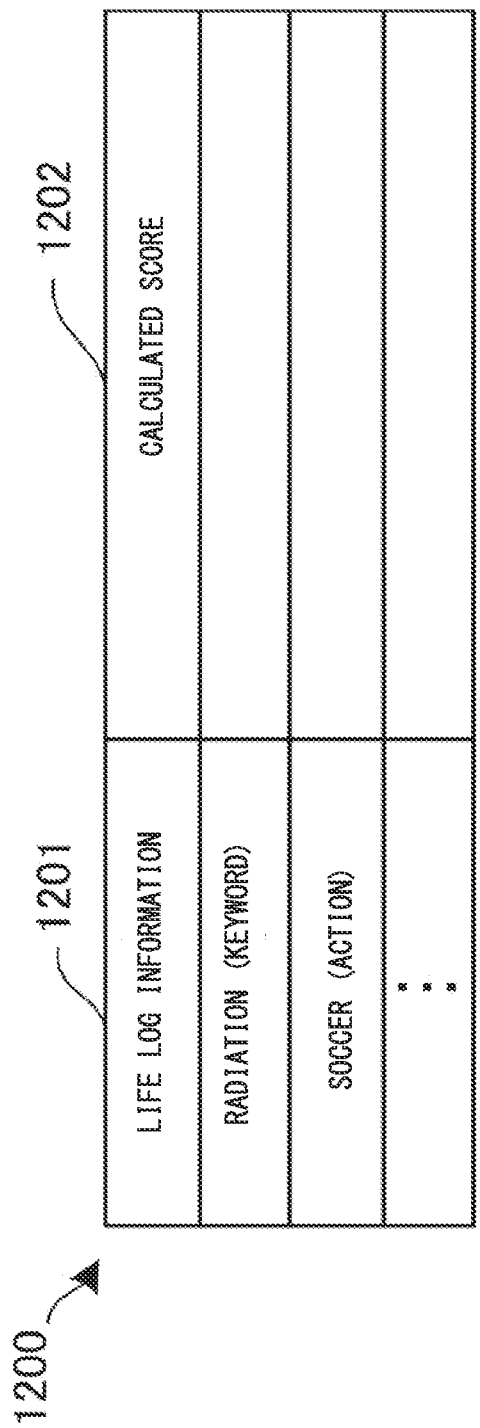
FIG. 12 shows a configuration of a calculated score table according to the second exemplary embodiment of the present invention.

FIG. 12 shows a configuration of a calculated score table 1200 according to the present exemplary embodiment. The calculated score table 1200 of FIG. 12 is a table that temporarily memorizes a total score that is calculated for each piece of life log information, using a user preference score calculation algorithm or a life log information deletion score calculation algorithm.

The calculated score table 1200 memorizes calculated scores 1202 while associating them with life log information 1201.

(User Preference Analysis Table)

Figure 13:
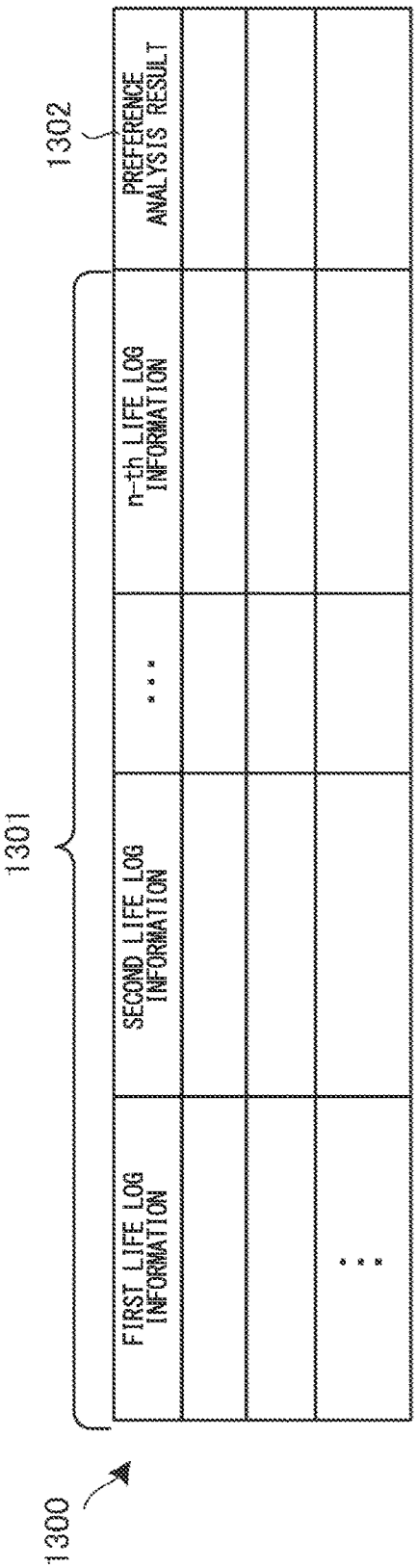
FIG. 13 shows a configuration of a user preference analysis table according to the second exemplary embodiment of the present invention.

FIG. 13 shows a configuration of a user preference analysis table 1300 according to the present exemplary embodiment. The user preference analysis table 1300 of FIG. 13 is a table that temporarily memorizes a preference analysis result that has been analyzed from combinations of life log information selected from life log information with high total scores.

The user preference analysis table 1300 memorizes preference analysis results 1302 analyzed based on the preference analysis table 820 so as to correspond to various combinations 1301 of the first life log information through the n-th life log information. The first life log information through the n-th life log information are selected from the life log information with high total scores that are calculated using the user preference score calculation algorithm.

<<Hardware Configuration of Information Processing Device>>

Figure 14:
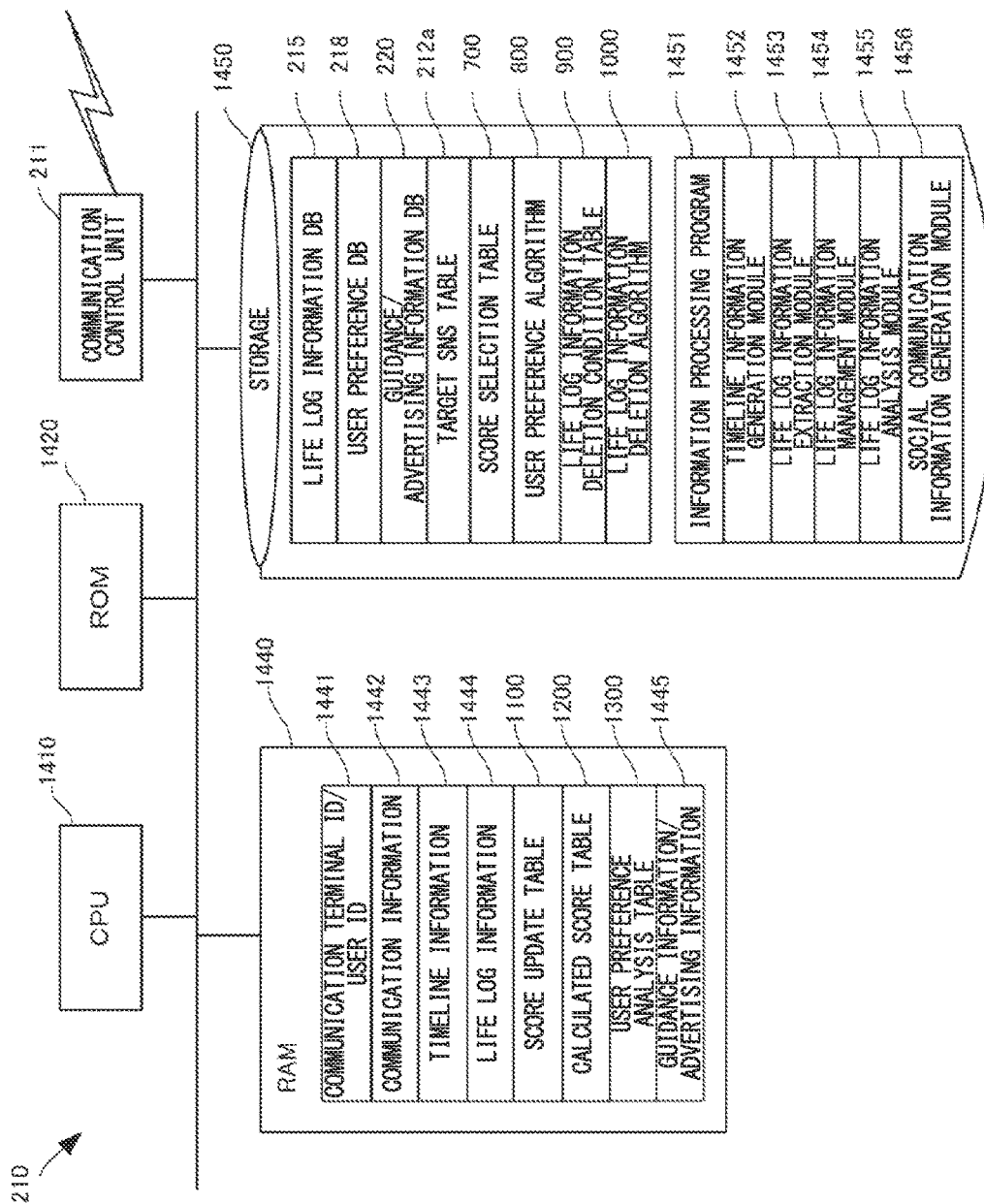
FIG. 14 is a block diagram showing a hardware configuration of an information processing device according to the second exemplary embodiment of the present invention.

FIG. 14 is a block diagram showing a hardware configuration of the information processing device 210 according to the present exemplary embodiment.

In FIG. 14, a CPU 1410 is a processor for calculation control, and it realizes each functional configuration unit of the information processing device 210 of FIG. 2 by executing a program. A ROM 1420 memorizes fixed data such as initial data and a program, and a program. The communication control unit 211 controls communication with another communication terminal 230, the first SNS server 241, the n-th SNS server 242, or the guidance/advertising information provision server 243, through a network.

A RAM 1440 is a random access memory that is used as a temporary memory work area by the CPU 1410. In the RAM 1440, there is ensured a region for memorizing data required for realizing the present exemplary embodiment. The RAM 1440 memorizes a communication terminal ID/user ID 1441 of a communication partner, communication information 1442, timeline information 1443, life log information 1444, a score update table 1100, a calculated score table 1200, a user preference analysis table 1300, and guidance information or advertising information 1445. The communication information 1442 is communication information that communicated by the communication terminal ID/user ID 1441. The timeline information 1443 is timeline information that is to be transmitted to a communication terminal 230 of the communication terminal ID, or that is obtained from a SNS server to which the user is logged in. The life log information 1444 is life log information that has been extracted from the communication information 1442. The score update table 1100 is used for generating/updating life log information stored in the life log information DB 215 shown in FIG. 11. The calculated score table 1200 is a table that memorizes a total calculated score calculated for each piece of life log information based on the score calculation algorithm shown in FIG. 12. The user preference analysis table 1300 is a table for analyzing user preference by making reference to the user preference DB 218, based on combinations of time log information selected from the calculated score table 1200 in the score order. The guidance information or advertising information 1445 is read out from the guidance/advertising information DB 220 so as to correspond to the user preference.

A storage 1450 memorizes databases and various parameters, or data or a program described below required for realizing the present exemplary embodiment. The storage 1450 memorizes the life log information DB 215 shown in FIG. 5A and FIG. 5B, the user preference DB 218 shown in FIG. 6A, the guidance/advertising information DB 220 shown in FIG. 6B, and the target SNS table 212a shown in FIG. 7. Moreover, the storage 1450 memorizes the score selection table 700 shown in FIG. 7, the user preference algorithm 800 shown in FIG. 8, the life log information deletion condition table 900 shown in FIG. 9, and the life log information deletion algorithm 1000 shown in FIG. 10.

The storage 1450 stores an information processing program 1451, a timeline information generation module 1452, a life log extraction module 1453, a timeline information management module 1454, a life log information analysis module 1455, and a social communication information generation module 1456. The information processing program 1451 controls the entire information processing device 210, which functions as a SC server. The timeline information generation module 1452 generates timeline information in the information processing program 1451. The life log extraction module 1453 extracts life log information from communication information in the information processing program 1451. The timeline information management module 1454 generates/updates/deletes life log information of the life log information DB 215, in the information processing program 1451. The life log information analysis module 1455 finds a user preference by analyzing the life log information, in the information processing program 1451. In the information processing program 1451, the social communication information generation module 1456 generates guidance information or advertising information, which are communication information, so as to correspond to a user preference.

FIG. 14 shows only data and a program essential to the present exemplary embodiment, and it does not show any data or any program that are not related to the present exemplary embodiment.

<<Process Steps of Information Processing Device>>

Figure 15:
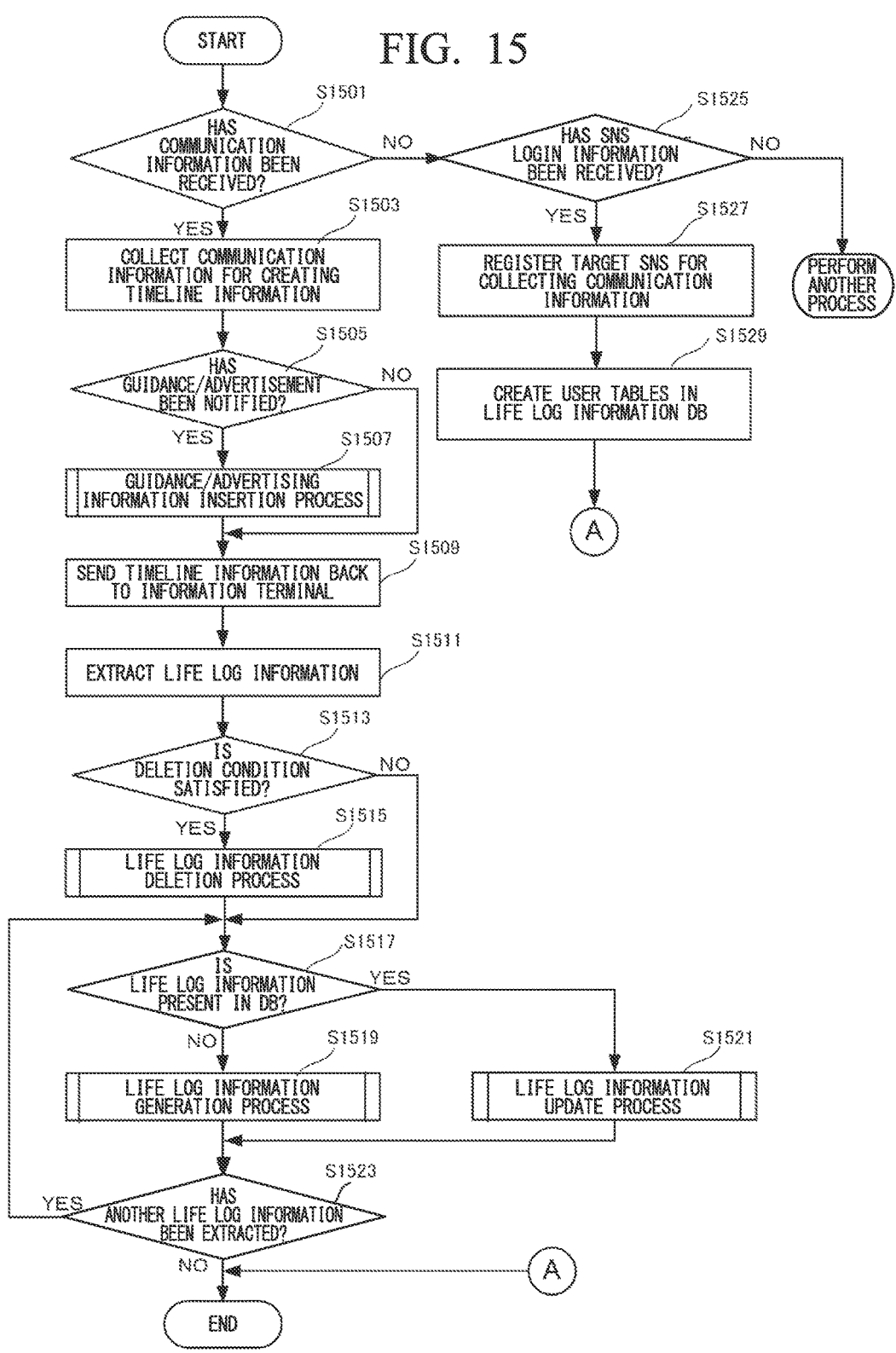
FIG. 15 is a flow chart showing process steps of the information processing device according to the second exemplary embodiment of the present invention.

FIG. 15 is a flow chart showing process steps of the information processing device 210 according to the present exemplary embodiment. This flow chart is executed by the CPU 1410 of FIG. 14 while using the RAM 1440, to realize each functional configuration unit of the information processing device 210 of FIG. 2.

First, in step S1501, the information processing device 210 determines whether communication information has been received from a communication terminal or a SNS. Moreover, in step S1525, the information processing device 210 determines whether information of logging-in to the SNS has been received.

If the communication information has been received, the process proceeds to step S1503, and the information processing device 210 collects communication information required for creating timeline information to create timeline information. In the present exemplary embodiment, there is created timeline formation in which communication information of a SNS among the SNSs, to which the user has logged in, that has instructed timeline display are sorted in chronological order (refer to FIG. 4A). In step S1505, the information processing device 210 determines whether a guidance/advertising notification should be made. If a guidance/advertising notification should be made, the process proceeds to step S1507, and the information processing device 210 executes a guidance/advertising information insertion process. Then, in step S1509, the information processing device 210 transmits the created timeline information back to the communication terminal 230. Therefore, in the case where step S1507 has been executed, as shown in the right side portion of FIG. 4B, guidance/advertising information is inserted in the timeline. In FIG. 15, there are described steps in the case of inserting guidance/advertising in the timeline. However, steps in the case shown in the left side portion of the FIG. 4B can be realized with simple adjustments.

In step S1511, the information processing device 210 extracts life log information contained in the newly received communication information. In step S1513, the information processing device 210 determines whether or not the deletion conditions of FIG. 9 are met. If the deletion conditions are met, the process proceeds to step S1515, and the information processing device 210 executes the life log information deletion process (refer to FIG. 16A). Next, in step S1517, the information processing device 210 determines whether the same life log information is already stored in the life log information DB 215 on the all or individual user unit basis. If the same life log information is not already stored, the process proceeds to step S1519, and the information processing device 210 executes the life log information generation process (refer to FIG. 16B). On the other hand, if the same life log information is already stored, the process proceeds to step S1521, and the information processing device 210 executes the life log information update process (refer to FIG. 16B). In step S1517, it is determined whether or not the same life log information is stored on the all or individual user unit basis. If no life log information is present neither on the all nor individual user unit basis, life log information is generated for both of them. If life log information is present for all users but not on the individual user unit basis, life log information is generated on the individual user unit basis, and the life log information is updated for all users.

In step S1523, in the life log information extraction of step S1511, in the case where several pieces of life log information are extracted, the process from step S1517 to step S1523 is repeated until the generation process or the update process of all life log information is completed.

When the information processing device 210 receives the SNS logging-in information (such as email address/password) from the communication terminal 230, the process proceeds from step S1525 to step S1527, and it registers the target SNS from which communication information or timeline information on the target SNS table 212a (refer to FIG. 7A) is to be collected. Then, the information processing device 210 creates a user table in the life log information DB 215.

(Life Log Information Deletion Process)

Figure 16A:
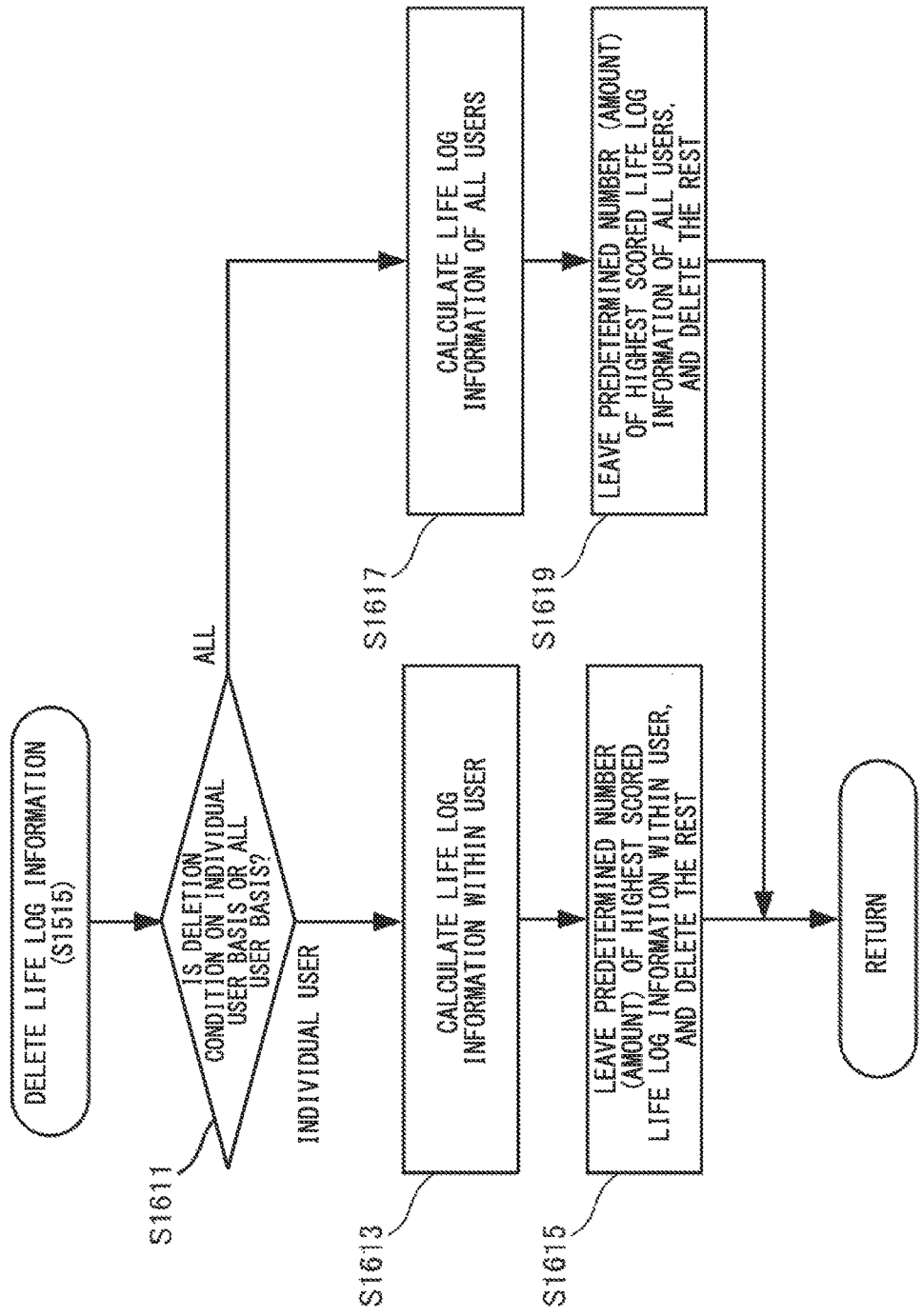
FIG. 16A is a flow chart showing process steps of a life log information deletion process according to the second exemplary embodiment of the present invention.

FIG. 16A is a flow chart showing process steps of a life log information deletion process S1515 according to the present exemplary embodiment.

First, in step S1611, the information processing device 210 determines whether the deletion condition is an individual user unit condition or an all user condition (refer to FIG. 9).

If the deletion condition is an individual user unit condition, the process proceeds to step S1613, and the information processing device 210 calculates a total score that represents the degree of contribution of the entire life log information to the generation of social communication, for each piece of life log information among users that met the deletion condition. In step S1615, the information processing device 210 retains a predetermined number (amount) of life log information from the highest total score among the life log information, and deletes the other life log information.

If the deletion condition is an all users condition, the process proceeds to step S1617, and it calculates a total score that represents the degree of contribution of the entire life log information to the generation of social communication, for all the pieces of life log information. In step S1619, the information processing device 210 retains a predetermined number (amount) of life log information from the highest total score among the entire life log information, and deletes the other life log information.

(Life Log Information Generation Process)

Figure 16B:
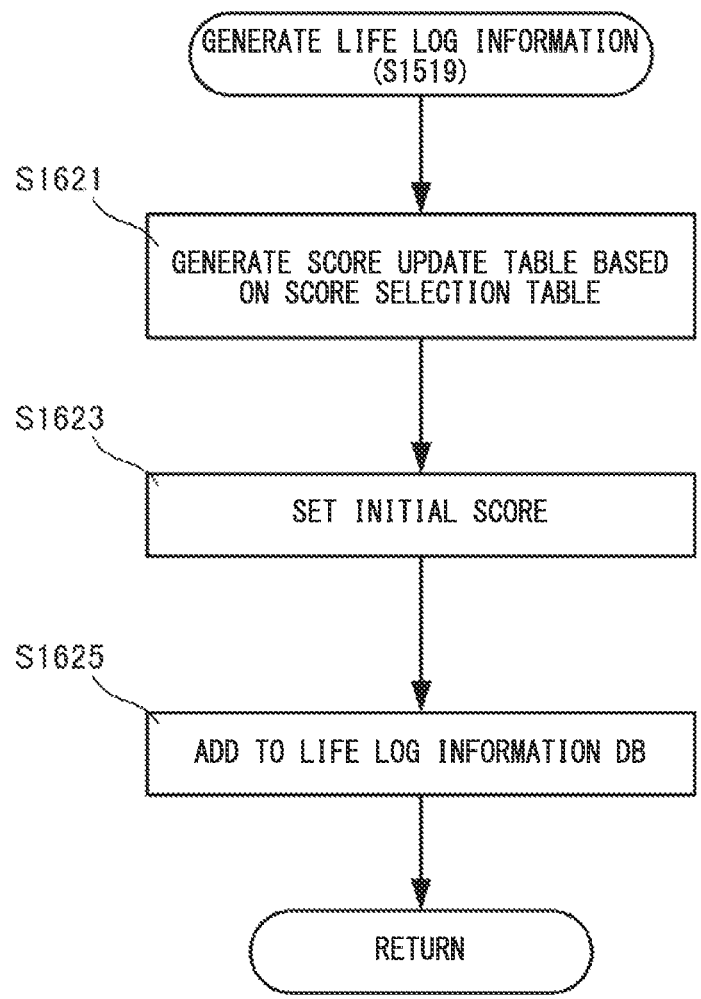
FIG. 16B is a flow chart showing process steps of a life log information generation process according to the second exemplary embodiment of the present invention.

FIG. 16B is a flow chart showing process steps of a life log information generation process S1519 according to the present exemplary embodiment.

First, in step S1621, the information processing device 210 generates a score update table 1100 (refer to FIG. 11) based on the score selection table 700 (refer to FIG. 7B). Next, in step S1623, the information processing device 210 sets an initial score. In step S1625, the information processing device 210 adds the initialized score update table 1100 to the life log information DB 215.

(Life Log Information Update Process)

Figure 16C:
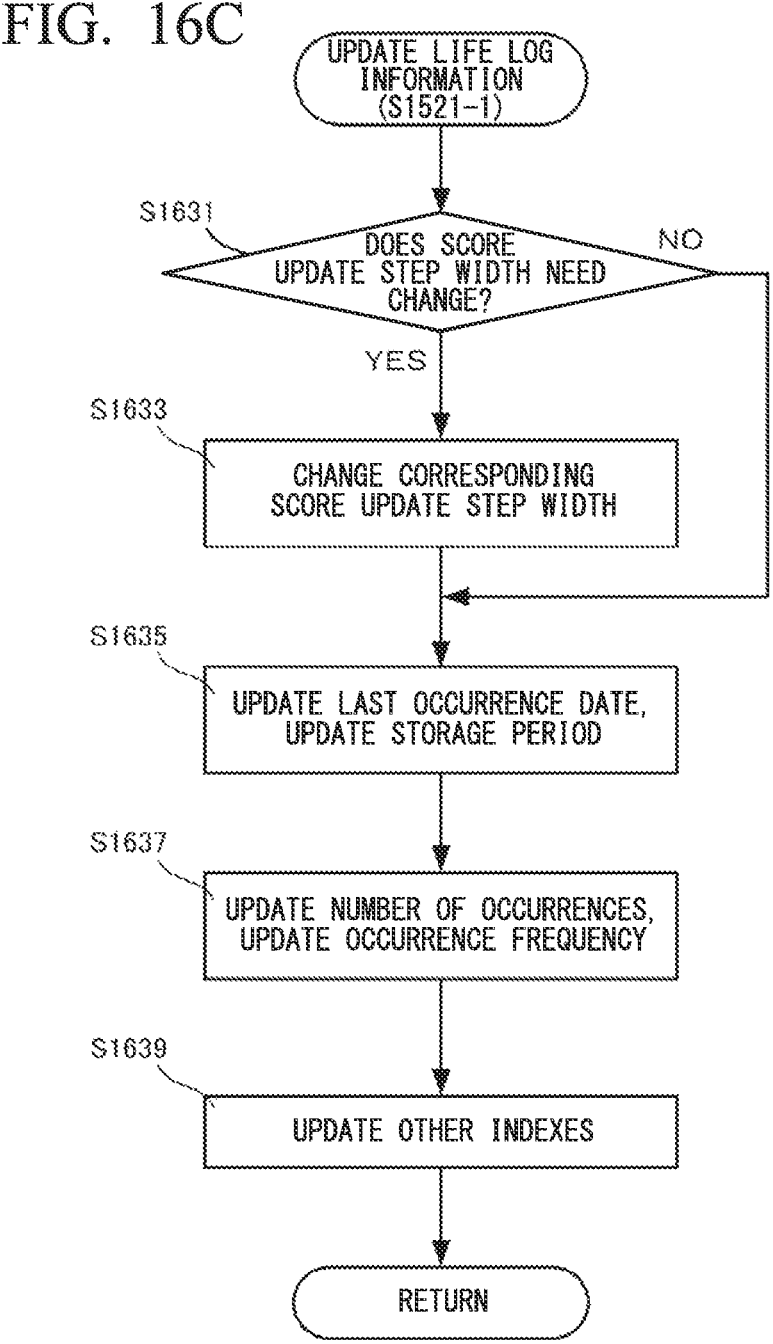
FIG. 16C is a flow chart showing process steps of a life log information update process according to the second exemplary embodiment of the present invention.

FIG. 16C is a flow chart showing process steps of a life log information update process S1521-1 according to the present exemplary embodiment. The life log information update process S1521-1 of the present exemplary embodiment is part of step S1521 of FIG. 15.

First, in step S1631, it is determined whether or not the score update step width needs to be changed (refer to FIG. 7B). If changes need to be made, the process proceeds to step S1633, and the information processing device 210 changes the corresponding score update step width. In step S1635, the information processing device 210 updates the indexes whose scores decrease such as last occurrence date and storage period. In step S1637, the information processing device 210 updates the indexes whose scores increase such as the number of occurrences and occurrence frequency. In step S1639, the information processing device 210 updates other indexes that need to be updated.

<<Hardware Configuration of Communication Terminal>>

Figure 17:
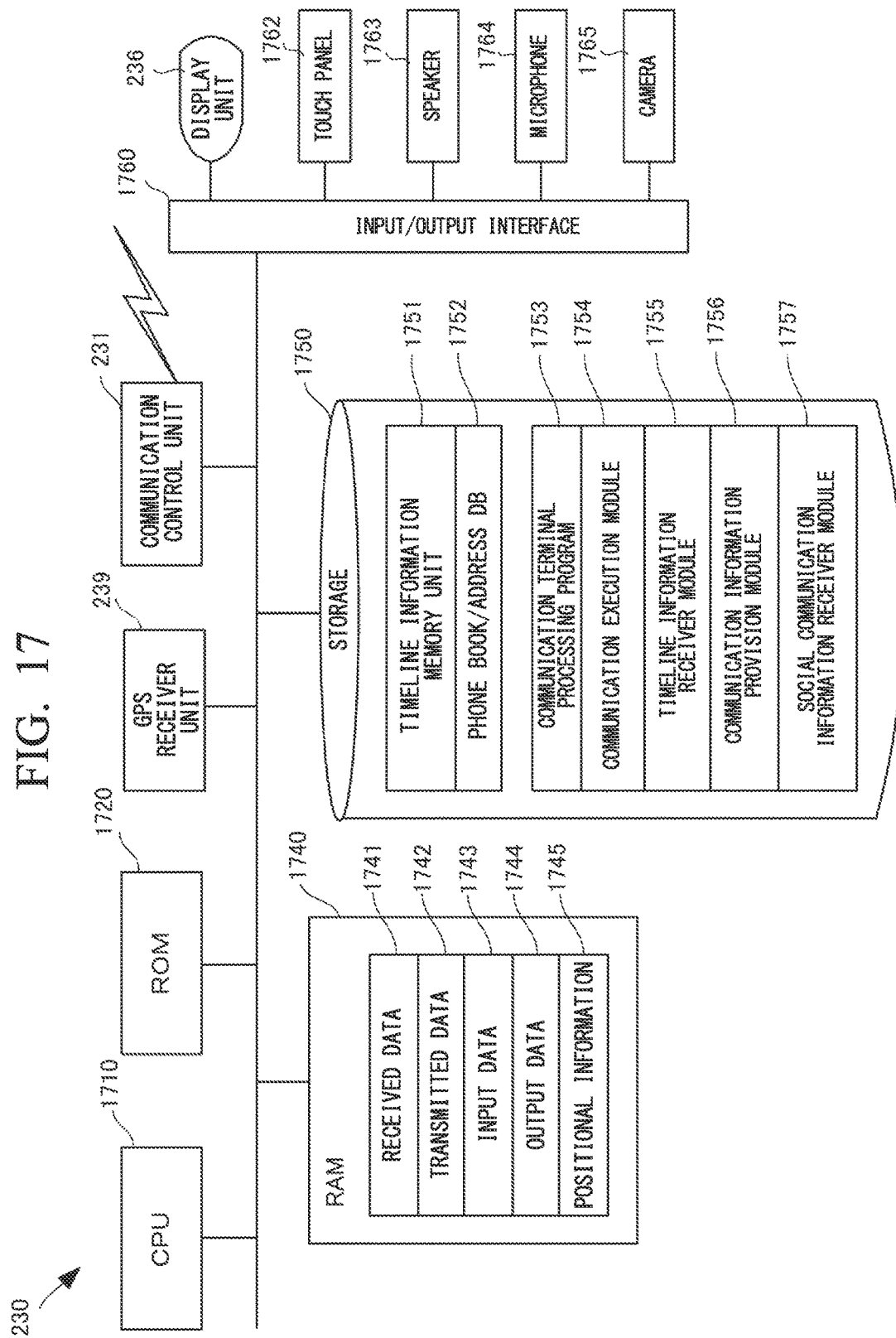
FIG. 17 is a block diagram showing a hardware configuration of the communication terminal according to the second exemplary embodiment of the present invention.

FIG. 17 is a block diagram showing a hardware configuration of the communication terminal 230 according to the present exemplary embodiment.

In FIG. 17, a CPU 1710 is a processor for calculation control, and it realizes each functional configuration unit of the communication terminal 230 of FIG. 2 by executing a program. A ROM 1720 memorizes fixed data such as initial data and a program, and a program. A GPS receiver unit 239 receives signals from GPS satellites. A communication control unit 231 controls communication with another information processing device 210, the first SNS server 241, or the n-th SNS server 242, through a network 150.

A RAM 1740 is a random access memory that is used as a temporary memory work area by the CPU 1710. In the RAM 1740, there is ensured a region for memorizing data required for realizing the present exemplary embodiment. The RAM 1740 memorizes received data 1741, transmission data 1742, input data 1743, output data 1744, and positional information 1745. The received data 1741 is data that has been received from the outside through the communication control unit 231. The received data 1742 is data that is to be transmitted to the outside through the communication control unit 231. The input data 1743 is data that is input from an input device through an input/output interface 1760. The output data 1744 is data that is output to an output device through the input/output interface 1760. The positional information 1745 is positional information of the communication terminal 230 that is calculated based on signals received from the GPS receiver unit 239.

A storage 1750 memorizes databases and various parameters, or data or a program described below required for realizing the present exemplary embodiment. That is to say, the storage 1750 memorizes a timeline information memory unit 1751 that memorizes timeline information received from the information processing device 210, and a phone book/address DB 1752 that stores destination partners of the communication terminal 230.

The storage 1750 stores a communication terminal processing program 1753, a communication execution module 1754, a timeline information receiver module 1755, a communication information provision module 1756, and a social communication information receiver module 1757. The communication terminal processing program 1753 controls the entire communication terminal 230. In the communication terminal processing program 1753, the communication execution module 1754 executes communication via a SNS. In the communication terminal processing program 1753, the timeline information receiver module 1755 receives timeline information from the information processing program 210. In the communication terminal processing program 1753, the communication information provision module 1756 provides communication information itself, or information for obtaining communication information from a SNS (such as email address and password) to the information processing device 210. The social communication information receiver module 1757 receives, from the information processing device 210, guidance information and/or advertising information, which are social communication information, so as to correspond to a user preference.

The input/output interface 1760 receives digital data inputs of information input from a touch panel 1762 serving as an operation unit 238, a microphone 1764 included in a voice processing unit 237, and a camera 1765 serving as an image capturing unit 240. The input/output interface 1760 outputs a generated display screen on the display unit 236, and outputs a reproduced voice to a speaker 1763 included in the voice processing unit 237.

FIG. 17 shows only data and a program essential to the present exemplary embodiment, and it does not show any data or any program that are not related to the present exemplary embodiment.

<<Process Steps of Communication Terminal>>

Figure 18:
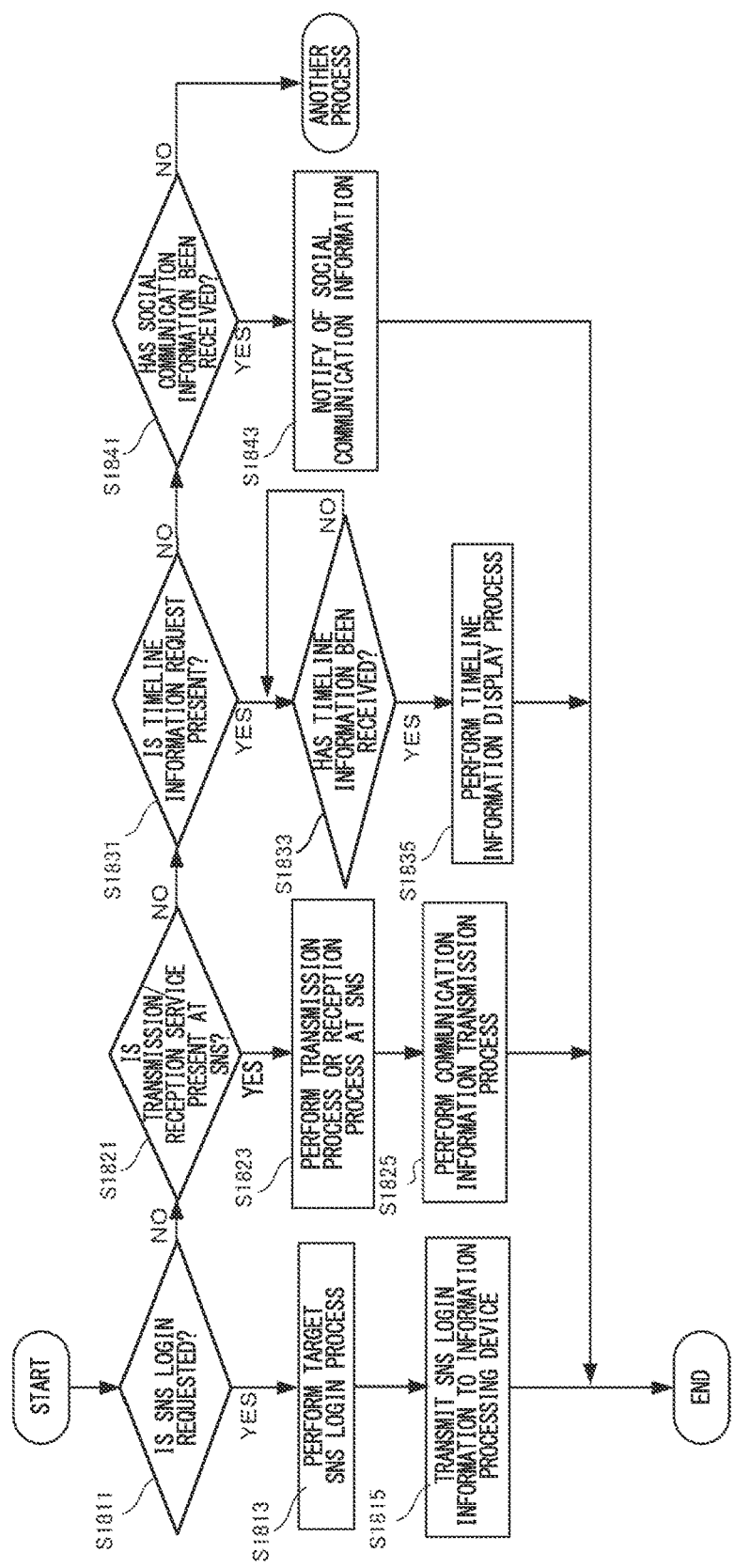
FIG. 18 is a flow chart showing process steps of the communication terminal according to the second exemplary embodiment of the present invention.

FIG. 18 is a flow chart showing process steps of the communication terminal 230 according to the present exemplary embodiment. This flow chart is executed by the CPU 1710 of FIG. 17 while using the RAM 1740, to realize each functional configuration unit of the communication terminal 230 of FIG. 2.

In step S1811, the communication terminal 230 determines whether or not a request for login to a SNS is present (refer to the left side portion of FIG. 4A). In step S1821, the communication terminal 230 determines whether or not a request for a transmission/reception service at the SNS is present. In step S1831, the communication terminal 230 determines whether or not a request to the information processing device 210 for timeline information is present. In step S1841, the communication terminal 230 determines whether or not a request from the information processing device 210 for social communication information has been received.

If a request for a login to a SNS is present, the process proceeds to step S1813, and the communication terminal 230 executes a login process to the target SNS. Then, the communication terminal 230 transmits the login information also to the information processing device 210. If a transmission/reception service request at the SNS is present, the process proceeds to step S1823, and the communication terminal 230 performs a SNS transmission process or a SNS reception process. Then, in step S1825, the communication terminal 230 transmits the communication information that includes the transmitted/received information or positional information. If a request for timeline information is present, the communication terminal 230 transmits the request to the information processing device 210, and then, the process proceeds to step S1833 and waits to receive the timeline information from the information processing device 210. If the timeline information has been received, the process proceeds to step S1835, and the communication terminal 230 displays the received timeline information. If the social communication information has been received, the process proceeds to step S1843, and the communication terminal 230 notifies the user of guidance information and/or advertising information, which are social communication information, on the screen or by voice.

[Third Exemplary Embodiment]

Next, an information processing system according to a third exemplary embodiment of the present invention is described. The information processing system according to the present exemplary embodiment differs from the above second exemplary embodiment in the following point. In the information processing system according to the present exemplary embodiment, an information processing device that functions as an SC server actively adds life log information to social communication information to be provided to a user, and it updates life log information of a life log information DB based on reactions of users. Other configurations and operations in the present exemplary embodiment are similar to those of the second exemplary embodiment. Therefore, the same configurations and operations are given the same reference symbols and detailed descriptions thereof are omitted.

According to the present exemplary embodiment, it is possible to actively obtain a more useful contribution to social communication generation, from social communication information provided to users.

<<Configuration of Information Processing System>>

Figure 19:
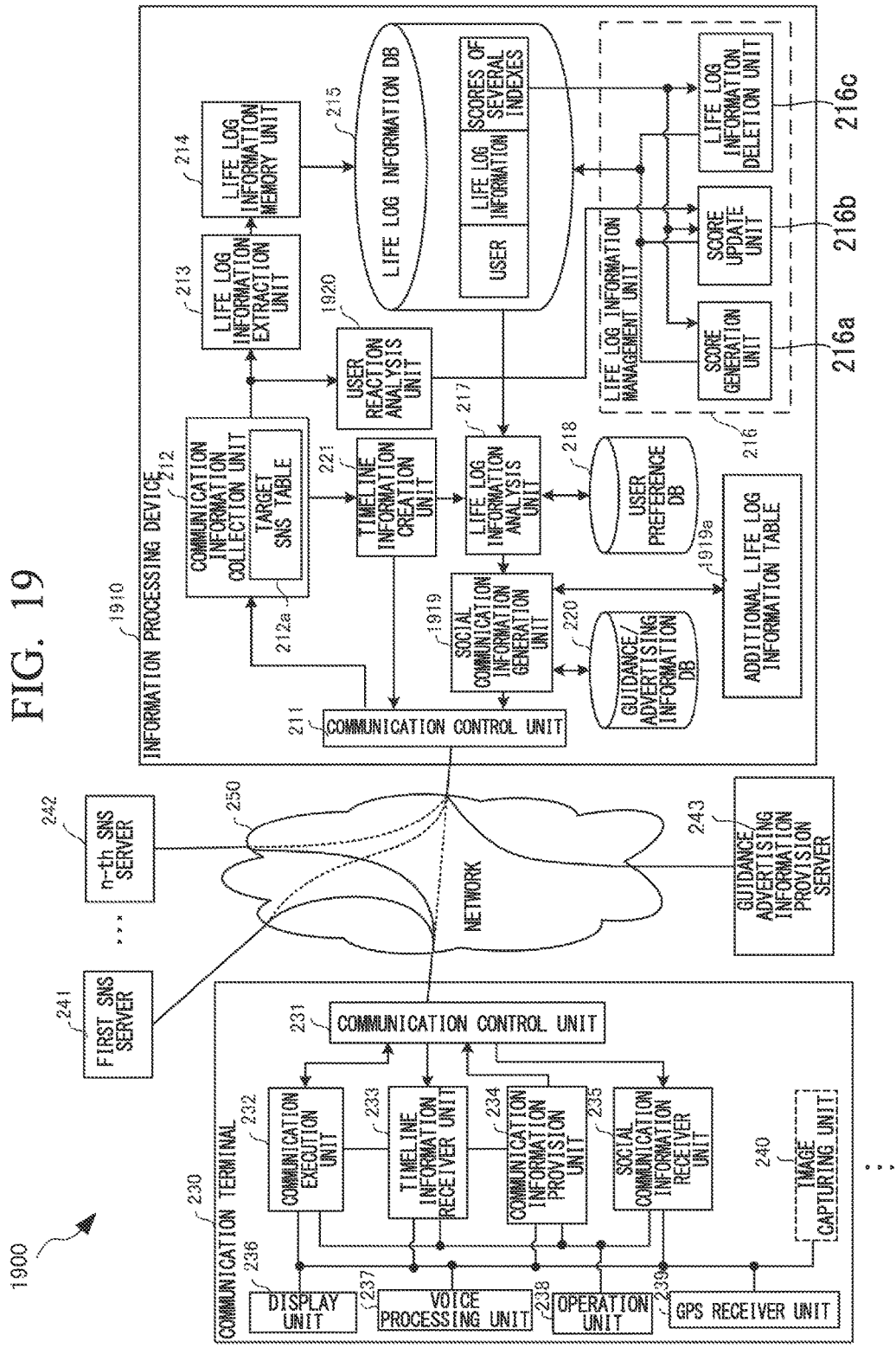
FIG. 19 is a block diagram showing a configuration of an information processing system according to a third exemplary embodiment of the present invention.

FIG. 19 is a block diagram showing a configuration of an information processing system 1900 according to the present exemplary embodiment. The information processing system 1900 of FIG. 19 is of a configuration where a user reaction analysis unit 1920, which analyzes user reactions to social communication, is added to the information processing system 200 shown in FIG. 2 of the second exemplary embodiment. A social communication information generation unit 1919 is capable of adding life log information to guidance/advertising information. Other configurations and operations in the present exemplary embodiment are similar to those of the second exemplary embodiment. Therefore, the same configurations and operations are given the same reference symbols and detailed descriptions thereof are omitted.

The user reaction analysis unit 1920 of an information processing device 1910 identifies, from the communication information collected by the communication information collection unit 212, a user response to guidance/advertising information that is generated by the social communication information generation unit 1919 and transmitted to the communication terminal 230. Then, the user reaction analysis unit 1920 analyzes the user reaction to the transmitted guidance/advertising information, based on the user response. In the user reaction analysis, for example, it is analyzed whether a reaction to the transmitted guidance/advertising information by means of text mining from a message, which is communication information, is a positive reaction or a negative reaction. If guidance information is about an event, the user reaction analysis unit 1920 analyzes a user reaction based on reservations of the ticket thereof or behavioral information of event participants. If advertising information is a product advertisement, the user reaction analysis unit 1920 analyzes a user reaction based on inquiries made to stores or product purchases. The user reaction analysis unit 1920 analyzes a user reaction based also on behaviors such as forwarding the guidance/advertising information to another user, and introducing it in a message.

The user reaction analysis is not limited to the above examples. In the present exemplary embodiment, these user reactions are used for life log information management, and are combined with changing life log information score, or score learning for social communication generation. Therefore, in the present exemplary embodiment, life log information is actively added to guidance/advertising information so that the guidance/advertising information makes an effective contribution to social communication generation with user reactions.

As with the second exemplary embodiment, the social communication information generation unit 1919 transmits guidance/advertising information that corresponds to a user preference, based on the guidance/advertising information DB 220. Furthermore, the social communication information generation unit 1919 can make reference to an additional life log information table 1919*a*, and add life log information to the guidance/advertising information so that user responses to the guidance/advertising information contribute to social communication generation.

(Additional Life Log Information Table)

FIG. 20 shows a configuration of the additional life log information table 1919*a* according to the present exemplary embodiment. This additional life log information table 1919*a* provides, to the social communication information generation unit 1919 of FIG. 19, life log information to be attached to guidance/advertising information.

The additional life log information table 1919*a* memorizes first attachment candidate life log information 2003 and second attachment candidate life log information 2004, while associating them with a user preference target 2001 obtained by the life log information analysis unit 217 and guidance/advertising information 2002 selected by the social communication information generation unit 1919. In this manner, with life log information being actively added and thereby each communication information influencing life log information, a clearer user preference analysis becomes possible.

(User Reaction Association Table)

Figure 21:
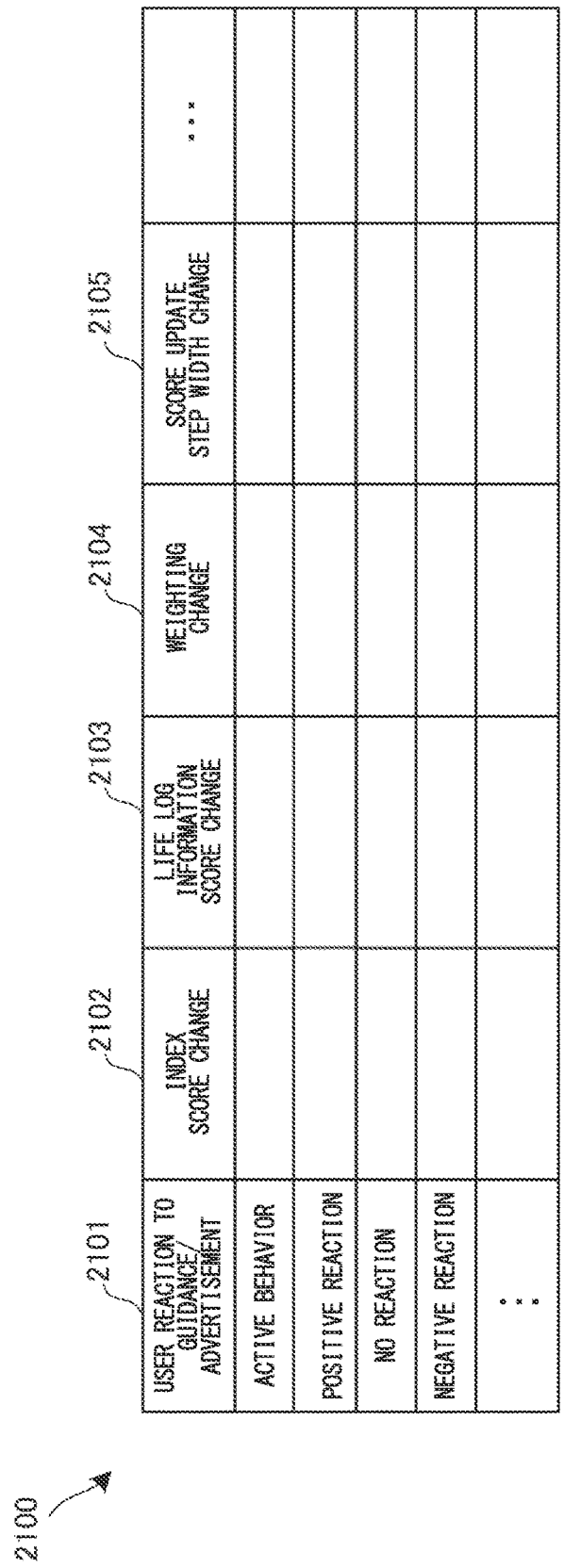
FIG. 21 shows a configuration of a user reaction association table according to the third exemplary embodiment of the present invention.

FIG. 21 shows a configuration of a user reaction association table 2100 according to the present exemplary embodiment. This user reaction association table 2100 is a table that shows how a user reaction to guidance/advertisement reflects life log information scores. The user reaction analysis unit 1920 has the user reaction association table 2100. The score update unit 216b of the life log information management unit 216 may have the user reaction association table 2100.

The user reaction association table 2100 memorizes index score changes 2102 to respective indexes, life log information score changes 2103 to the entire life log information, and further, weight changes 2104 and score update step widths 2105 related to FIG. 7B, while associating them with user reactions 2101 to a guidance/advertisement. Reflection to the scores may be made to one of the above change items, or to a combination of the several change items.

The "active behavior" of FIG. 21, if the guidance information is about an event, includes reservations of the ticket thereof or behavioral information of event participants. If advertising information is a product advertisement, the "active behavior" includes inquiries made to stores or product purchases. The "active behavior" also includes behaviors such as forwarding the guidance/advertising information to another user, and introducing it in a message. A means of text mining from a message can be used to determine whether a reaction is a positive reaction or a negative reaction, and therefore detailed description thereof is omitted. If a user has taken an "active behavior" or expressed a "positive reaction" of FIG. 21, social communication can be seen as having been established.

(Score Change Table)

Figure 22:
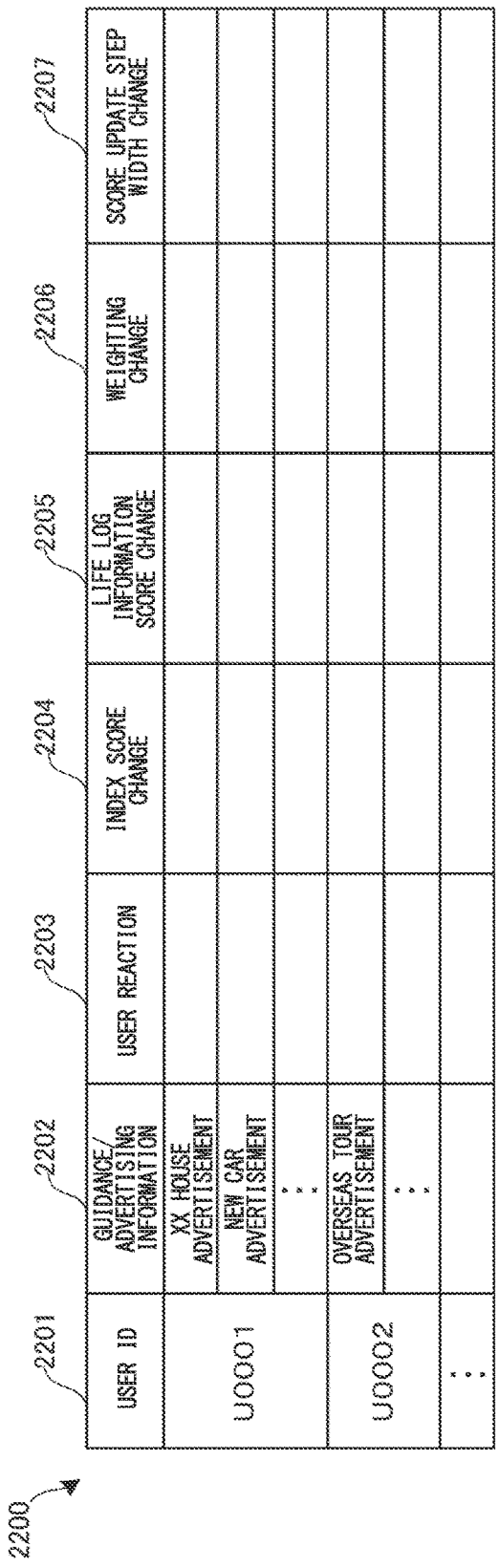
FIG. 22 shows a configuration of a score change table according to the third exemplary embodiment of the present invention.

FIG. 22 shows a configuration of a score change table 2200 according to the present exemplary embodiment. The score change table 2200 is a table for reflecting user reaction to the guidance/advertising information transmitted by the social communication information generation unit 1919, to thereby update scores. The score update unit 216b of the life log information management unit 216 has the score change table 2200.

In the score change table 2200, for each user ID 2201, there are memorized an index score change 2204, a life log information score change 2205, a weight change 2206, and a score update step width change 2207, while associating them with the guidance/advertising information 2202 and the user reaction 2203. Reflection to the scores may be made to one of the above change items, or to a combination of the several change items.

<<Process Steps of Information Processing Device>>

Next, there are shown process steps of the information processing device 1910 according to the present exemplary embodiment. These process steps are executed by the CPU 1410 of FIG. 14 while using the RAM 1440, to realize a new functional configuration unit of the information processing device 1910 of FIG. 19.

(Guidance/Advertising Information Insertion Process)

Figure 23:
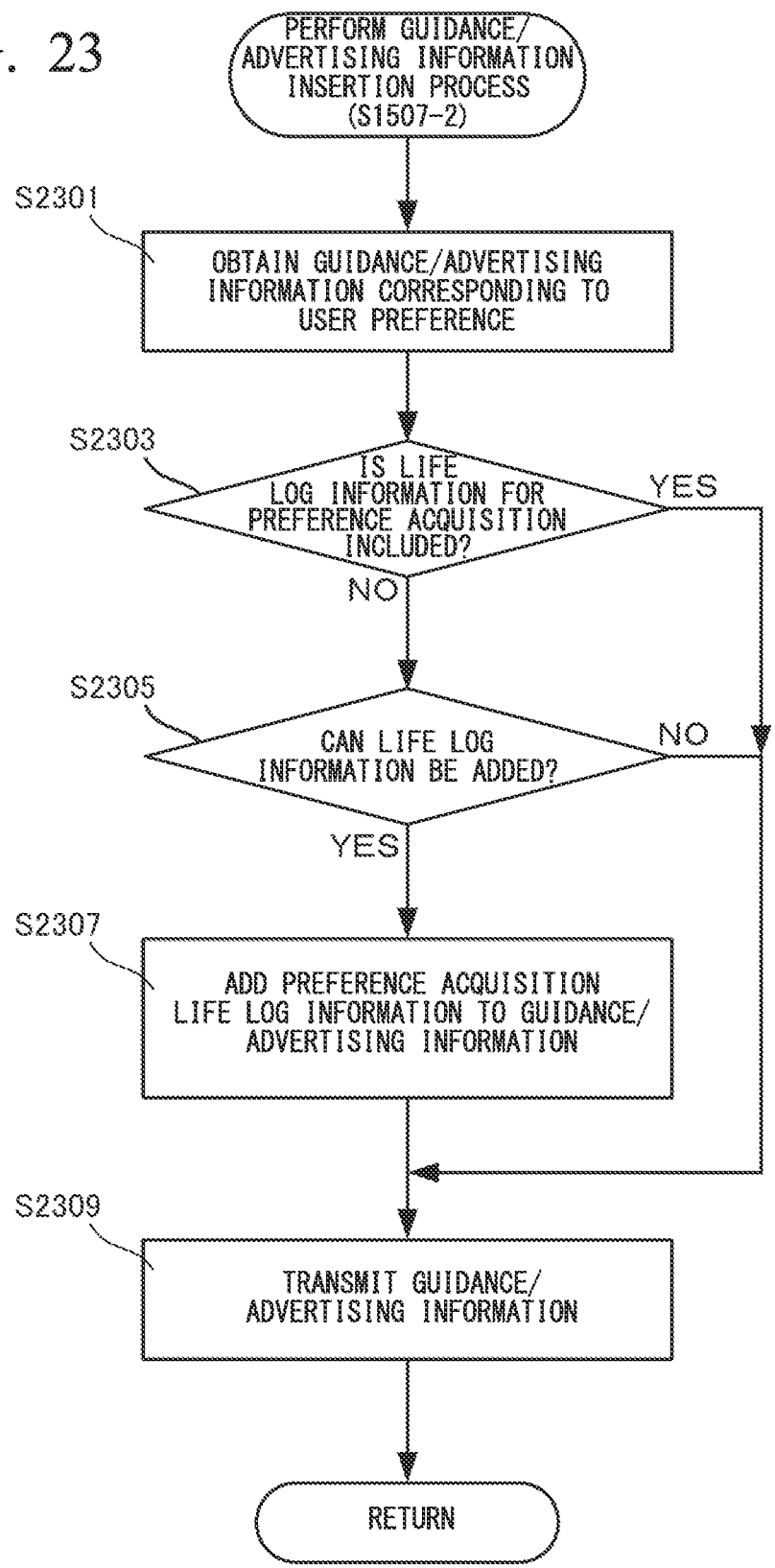
FIG. 23 is a flow chart showing process steps of a guidance/advertising information insertion process according to the third exemplary embodiment of the present invention.

FIG. 23 is a flow chart showing process steps of a guidance/advertising information insertion process according to the present exemplary embodiment. A guidance/advertising information insertion process S1507-2 of the present exemplary embodiment is a process that replaces step S1507 of FIG. 15.

First, in step S2301, the information processing device 1910 obtains, from the guidance/advertising information DB 220, guidance information or advertising information that corresponds to the user preference. In step S2303, the information processing device 1910 determines whether or not the guidance/advertising information includes life log information that is suitable for user preference acquisition. If the guidance/advertising information includes life log information that is suitable for user preference acquisition, the process proceeds to step S2309. If the guidance/advertising information does not include life log information that is suitable for user preference acquisition, the process proceeds to step S2305. In step S2305, the information processing device 1910 determines whether or not life log information can be added to the guidance/advertising information. If life log information cannot be added, the process proceeds to step S2309. If life log information can be added, the process proceeds to step S2307. In step S2307, the information processing device 1910 adds, to the guidance/advertising information, the life log information that is suitable for user preference acquisition. Then, in step S2309, the information processing device 1910 transmits the guidance information or the advertising information to the communication terminal 230.

(Life Log Information Update Process)

Figure 24:
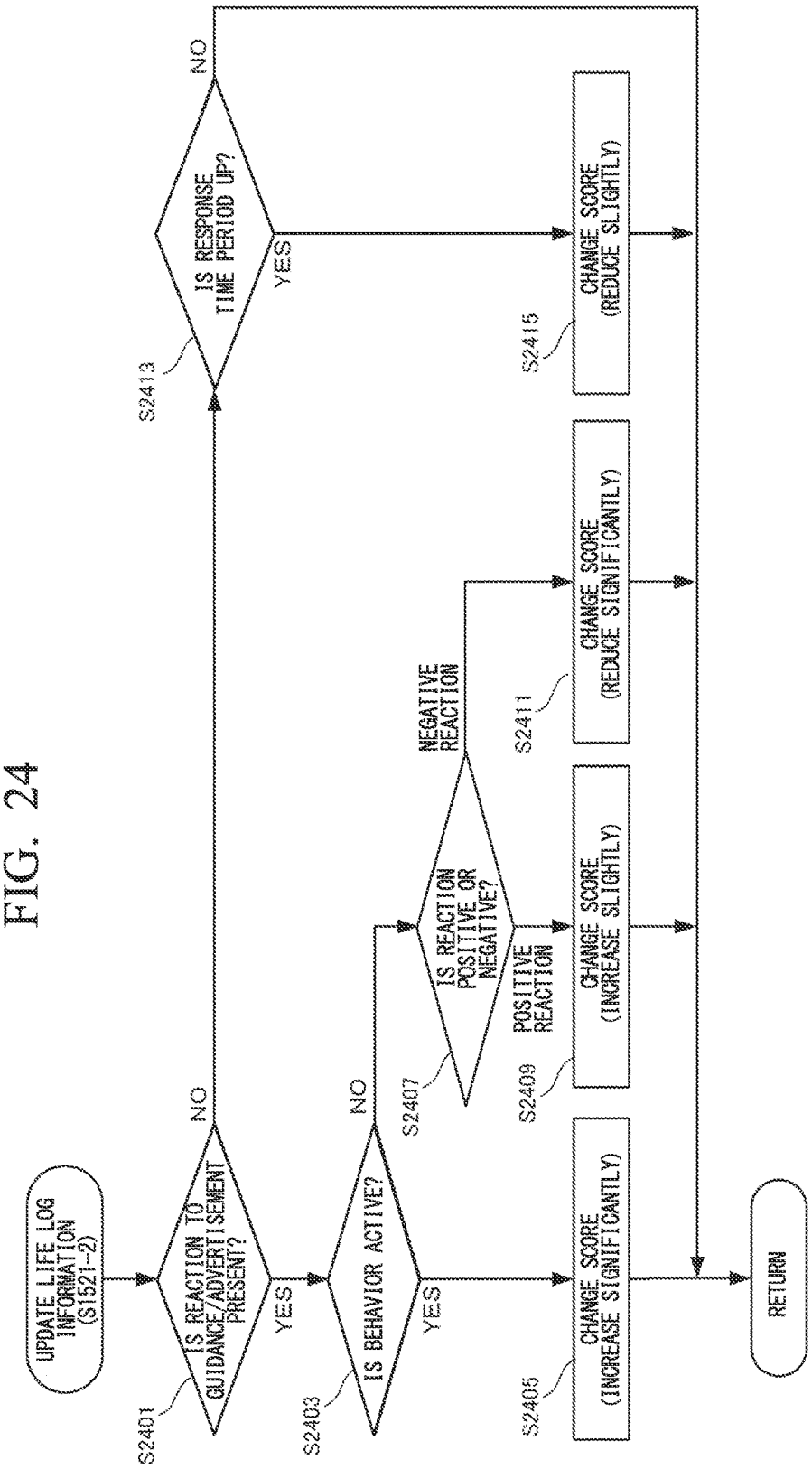
FIG. 24 is a flow chart showing process steps of a life log information update process according to the third exemplary embodiment of the present invention.

FIG. 24 is a flow chart showing process steps of a life log information update process S1521-2 according to the present exemplary embodiment. The life log information update process S1521-2 of the present exemplary embodiment is part of step S1521 of FIG. 15, and is executed together with the life log information update process S1521-1 of FIG. 16C.

First, in step S2401, the information processing device 1910 determines whether or not there has been a reaction to the guidance/advertising information. If there has been a reaction to the guidance/advertising information, the process proceeds to step S2403, and it is determined whether it is an active behavior of a user toward the guidance/advertising information. If the user reaction is an active behavior, the process proceeds to step S2405. In step S2405, the information processing device 1910 significantly increases the score of the life log information included in the guidance/advertising information.

If the user reaction is not an active behavior, the process proceeds to step S2407. In step S2407, the information processing device 1910 determines whether the user reaction is a positive reaction or a negative reaction, for example, by means of text mining. If the reaction is a positive reaction, the process proceeds to step S2409. In step S2409, the information processing device 1910 slightly increases the score of the life log information included in the guidance/advertising information. If the reaction is a negative reaction, the process proceeds to step S2411. In step S2411, the information processing device 1910 significantly reduces the score of the life log information included in the guidance/advertising information.

If it is determined that there has been no user reaction in step S2401, in step S2413, the information processing device 1910 determines whether or not a predetermined response period has passed and the time is up. If the predetermined response period has passed, the process proceeds to step S2415. In step S2415, the information processing device 1910 treats the guidance/advertising information as not being of an interest to the user, and slightly reduces the score of the life log information included in the guidance/advertising information.

The degrees of score changes in FIG. 24 expressed as "significantly" and "slightly" only illustrate as an example a case where there are four degrees of score changes. Specific values of score change degrees are set, depending on the scoring method used.

[Fourth Exemplary Embodiment]

Next, an information processing system according to a fourth exemplary embodiment of the present invention is described. The information processing system according to the present exemplary embodiment differs from the above second exemplary embodiment and third exemplary embodiment in that different methods for scoring respective indexes and different method for scoring the entire life log information are used between different SNSs or other networks. In the present exemplary embodiment, weighting is performed differently between different SNSs or other networks. Other configurations and operations in the present exemplary embodiment are similar to those of the second exemplary embodiment or third exemplary embodiment. Therefore, the same configurations and operations are given the same reference symbols and detailed descriptions thereof are omitted.

According to the present exemplary embodiment, it is possible to eliminate variation in contribution of collected communication information to social communication generation, and obtain more accurate user characteristics.

(SNS Weighting Table)

FIG. 25 shows a configuration of a SNS weighting table 2500 according to the present exemplary embodiment. The SNS weighting table 2500 of FIG. 25 is a table for updating scores of different life log information, depending on through which SNS, collected communication information has been communicated. For example, score updating differs depending on whether the SNS is a social network for random chatting, or a social network for information exchange with targets or purposes. Score updating may differ, depending also on whether communication of the SNS is exchanged anonymously or with real names. That is to say, whether or not information contributes to new social communication generation and enables clearer user preference analysis is distinguished by SNSs.

The SNS weighting table 2500 memorizes an index weight change 2502 that is a change in index weighting, and a life log information weight change 2503 that is a change in life log information weighting, while associating them with SNS 2501. In FIG. 25, as an index weight change 2502, the numbers to be added to the number of occurrences and occurrence frequency are changed so as to correspond to a SNS. For example, the number of occurrences of life log information in the communication information at the first SNS becomes smaller than 1. Moreover, the number of occurrences of life log information in the communication information at the second SNS becomes greater than 1. According to the life log information weight change 2503, with respect to the score of the entire life log information, influence of the life log information in the communication information at the first SNS on the score is small. On the other hand, with respect to the score of the entire life log information, influence of the life log information in the communication information at the second SNS on the score is great.

<<Process Steps of Information Processing Device>>

Figure 26:
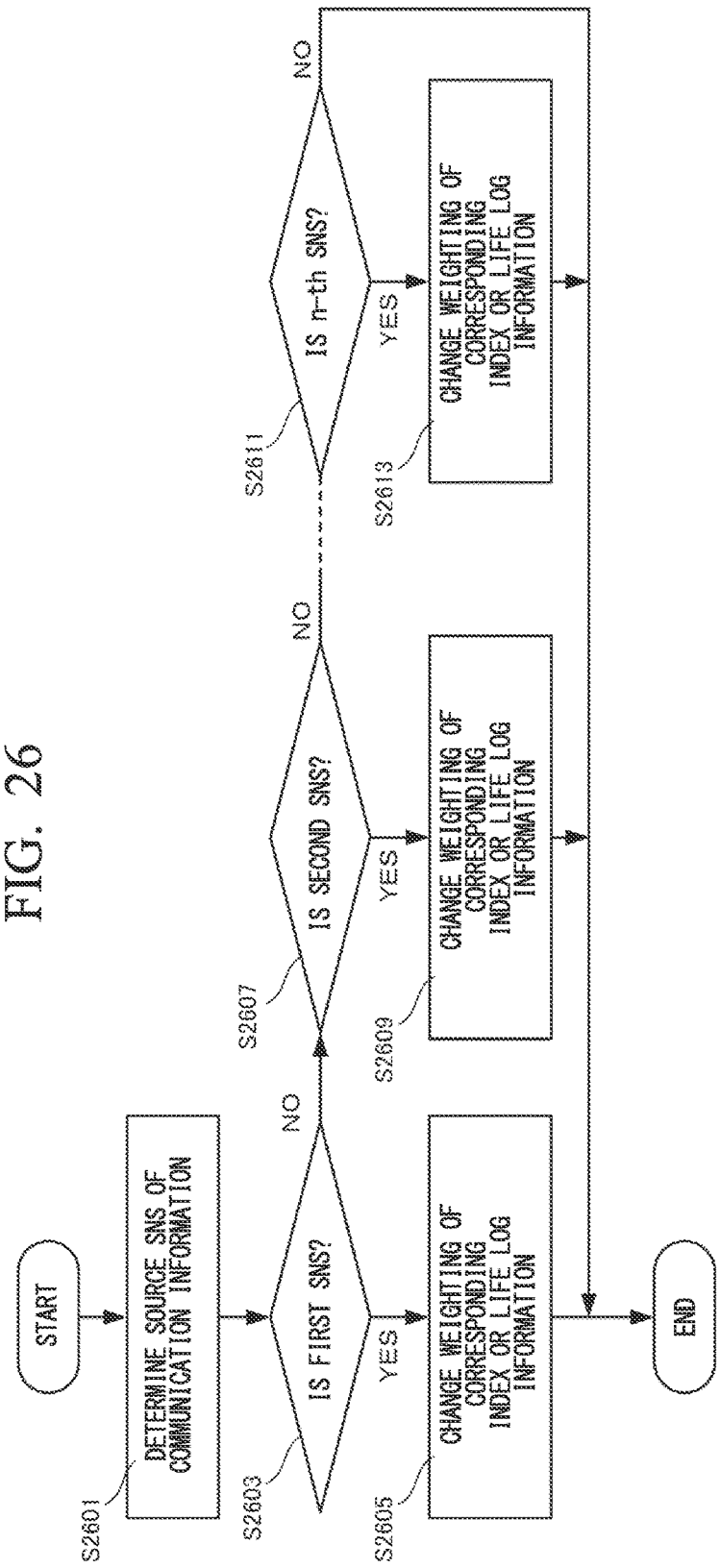
FIG. 26 is a flow chart showing process steps of an information processing device according to the fourth exemplary embodiment of the present invention.

FIG. 26 is a flow chart showing process steps of the information processing device 210 or 1910 according to the present exemplary embodiment. This flow chart is executed by the CPU 1410 of FIG. 14 while using the RAM 1440, to realize a functional configuration unit of FIG. 2 or FIG. 19, in particular, an improved score update unit 216b of the life log information management unit 216.

First, in step S2601, the information processing device 210 or 1910 determines at which SNS the obtained communication information has been serviced. Hereunder, in steps S2603, S2607, and S2611, it is determined at which one of the first SNS, the second SNS, and the n-th SNS the communication information has been obtained. According to the determination result, FIG. 25 is referenced for the determined SNS, and in steps S2605, S2609, and S2613, the information processing device 210 or 1910 changes the weighting of the index or the life log information.

[Fifth Exemplary Embodiment]

Next, an information processing system according to a fifth exemplary embodiment of the present invention is described. The information processing system according to the present exemplary embodiment differs from the above second exemplary embodiment through fourth exemplary embodiment in the following points. That is to say, in the present exemplary embodiment, a communication terminal combines timeline information of different SNSs. Moreover, the communication terminal retains communication information for a predetermined period of time, and transmits them collectively to an information processing device. Other configurations and operations in the present exemplary embodiment are similar to those of the second exemplary embodiment through fourth exemplary embodiment. Therefore, the same configurations and operations are given the same reference symbols and detailed descriptions thereof are omitted.

According to the present exemplary embodiment, in addition to the above effect, it is possible to reduce the load on the information processing device that functions as a SC server.

<<Configuration of Information Processing System>>

Figure 27:
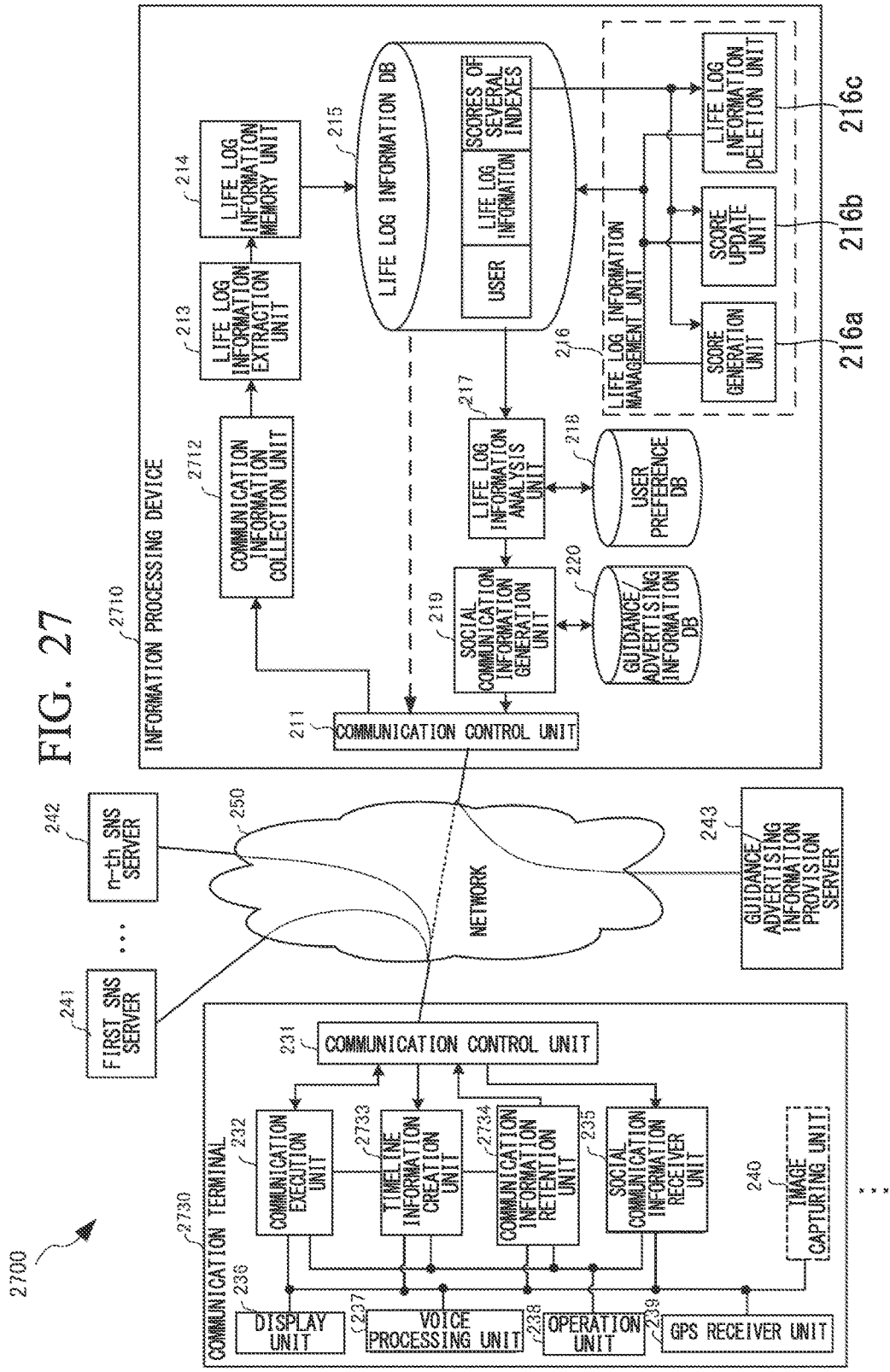
FIG. 27 is a block diagram showing a configuration of an information processing system according to a fifth exemplary embodiment of the present invention.

FIG. 27 is a block diagram showing a configuration of an information processing system 2700 according to the present exemplary embodiment. The information processing system 2700 of FIG. 27 is of a configuration where the information processing system 200 of FIG. 2 of the second exemplary embodiment has been modified. Therefore, functional configuration units that serve the same functions as those of the information processing system of FIG. 2 are given the same reference symbols, and descriptions thereof are omitted.

The information processing system 2700 includes an information processing device 2710 that is connected to a network 250, a communication terminal 2730, a first SNS server 241 to a n-th SNS server 242, and a guidance/advertising information provision server 243. The information processing device 2710 differs from the information processing system 200 in that a communication information collection unit 2712 does not have the target SNS table 212a unlike the communication information collection unit 212. Moreover, the information processing device 2710 differs from the information processing device 210 of FIG. 2 in that no timeline information creation unit 221 is provided therein.

The communication terminal 2730 has a timeline information creation unit 2733 that receives timeline information directly from several SNS servers 241 and 242, and that creates timeline information that combines the received timeline information in chronological order. Furthermore, the communication terminal 2730 has a communication information retention unit 2734 that retains communication information for a predetermined period of time, for example, for a day.

In the present exemplary embodiment, according to a program, which has been downloaded from the information processing device 2710 or has preliminarily been installed, the communication terminal 2730 combines the timeline information from the several SNS servers 241 and 242 and displays it. Moreover, since the communication terminal 2730 retains the communication information of a predetermined period and stores it as life log information, it transmits the communication information of the predetermined period collectively to the information processing device 2710.

When the timeline information creation unit 2733 creates timeline information, life log information of the respective users stored in the life log information DB 215 may be referenced to re-sort the timeline. In this case, before creating the timeline information, it is necessary that a predetermined highest number of life log information is transmitted, for example, to the communication terminal 2730 as shown with the dashed line arrow from the life log information DB 215 to the communication control unit 211 in FIG. 27. In this case, it is preferable that the communication terminal 2730 has a life log information extraction unit (in other words, includes a life log information extraction module).

<<Operation Steps of Information Processing System>>

Figure 28:
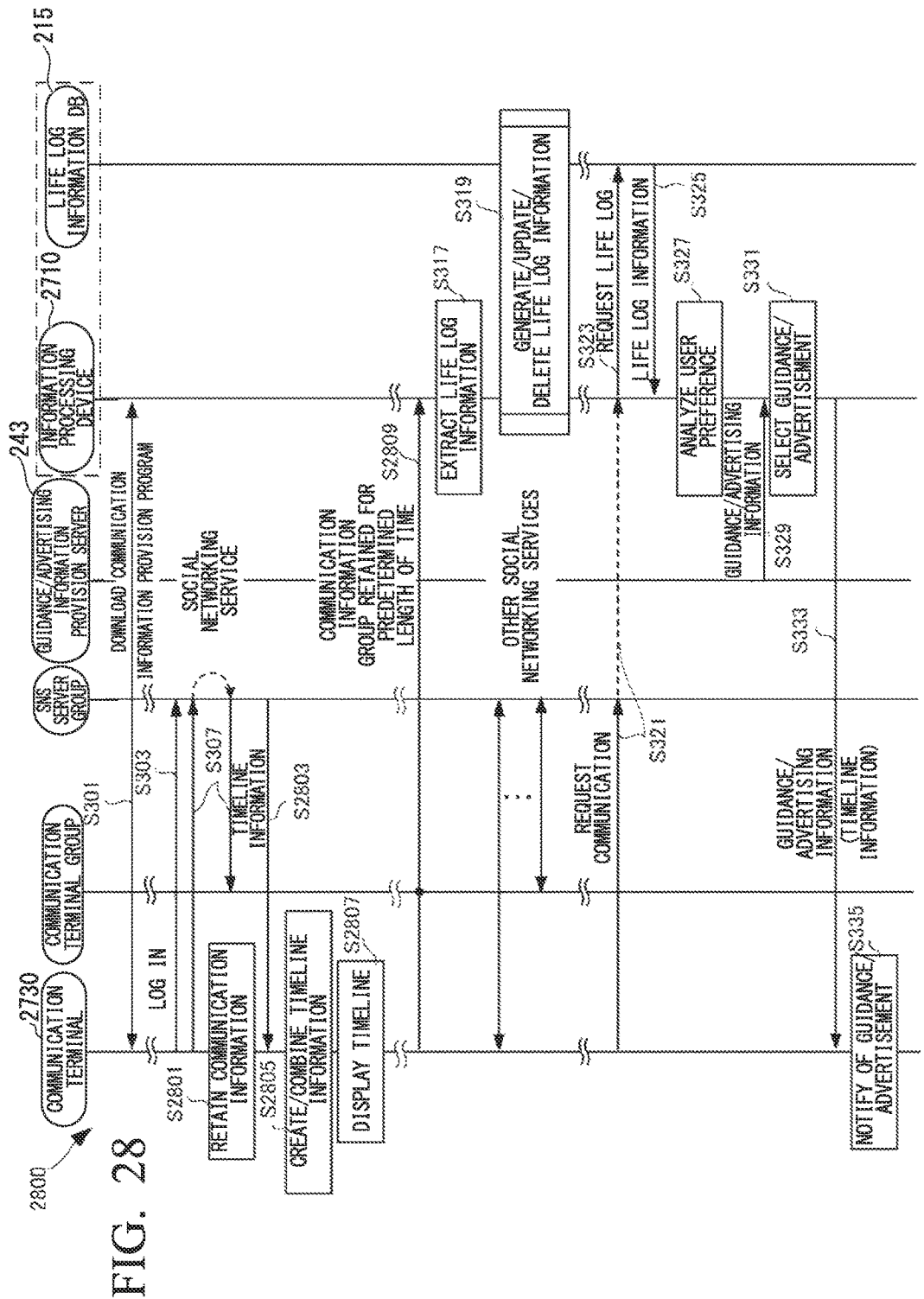
FIG. 28 is a sequence diagram showing operation steps of the information processing system according to the fifth exemplary embodiment of the present invention.

FIG. 28 is a sequence diagram showing operation steps 2800 of the information processing system 2700 according to the present exemplary embodiment. The operation steps 2800 of FIG. 28 are such that to the operations steps 300 of FIG. 3, there are added creation of timeline information combined by the communication terminal 2730, and retention of communication information. Moreover, the operation steps of FIG. 28 are such that creation of timeline information of the information processing device 2710 is removed from the operation steps 300 of FIG. 3. The same step numbers are given to steps that are the same as those in FIG. 3. The steps from the life log information extraction step S317 to the guidance/advertising notification step S335 are the same as those in FIG. 3, and therefore descriptions thereof are omitted.

In step S2801, communication information performed by the communication terminal 2730 is retained for a predetermined period of time, for example, for a day. In the case of retaining the communication information, at least the contents of the communication and the time of the communication are memorized. In the case where score weighting is performed based on which SNS server is used when the information processing device 2710 stores life log information, a SNS server ID that specifies the used SNS server is also memorized.

In step S2803, the communication terminal 2730 receives timeline information from the SNS server to which the user is logged in. In step S2805, the communication terminal 2730 creates the received timeline information. If the user is logged-in to several SNS servers, the communication terminal 2730 combines and re-sorts the timeline information in chronological order. In step S2807, the communication terminal 2730 displays the timeline based on the created or combined timeline information.

There is described a case where the information of the life log information DB 215 is referenced when creating timeline information. In this case, before performing the timeline process of step S2805 and step S2807, the communication terminal 2730 extracts life log information and receives the life log information of the life log information DB 215.

In step S2809, the communication information group of the predetermined period (one day) retained in step S2801 is transmitted to the information processing device 2710. To the communication information group to be transmitted, there are also added as necessary a communication time and SNS server ID.

Steps of guidance/advertising information notification in the sequence diagram of FIG. 28 are triggered based on a communication request from the communication terminal 230 in step S321. However, the guidance/advertising information may also be sequentially push-delivered from the information processing device 2710.

The hardware configurations and the flow charts of the information processing devices 2710 and 2730 in the present exemplary embodiment can be realized by making simple modifications to them in the diagrams of FIG. 14 through FIG. 18.

[Other Exemplary Embodiments]

The present invention has been described with reference to the exemplary embodiments. However, the invention is limited to the above exemplary embodiments. To the configurations and details of the present invention, there may be made, within the scope of the invention, various modifications that can be understood by a person skilled in the art. Moreover, the scope of the invention also includes a system or a device that freely combines the separate characteristics included in each exemplary embodiment.

Furthermore, the present invention may be applied to a system that is configured with a plurality of devices, and may be applied to a stand-alone device. The present invention may be applied to a case where a control program that realizes the functions of the exemplary embodiments is supplied directly or remotely to a system or a device. The scope of the present invention may also include a control program to be installed on a computer, a medium that stores the control program, and a WWW (world wide web) server that allows the control program to be downloaded, in order to realize the functions of the present invention on a computer.

A program for realizing the functions of the information processing devices 100, 210, 1910, and 2710, the communication terminals 230 and 2730, or the information processing systems 200, 1900, and 2700 may be recorded on a computer-readable recording medium, and this program recorded on the recording medium may be loaded onto and executed on a computer system, to thereby execute the processes described above.

The "computer system" here also includes an operating system and hardware such as peripheral devices.

The "computer system" includes a home page provision environment (or a display environment) in those cases of using a WWW system.

The "computer-readable recording medium" refers to a movable medium such as a flexible disc, an optical magnetic disc, a ROM, a CD-ROM, and a memory device such as a built-in hard disc drive in a computer system. The "computer-readable recording medium" also includes one that dynamically retains a program for a short period of time such as a communication line in the case of transmitting the program through a network including the Internet and a communication line including telephone line, and one that retains the program for a certain period of time such as a volatile memory inside a computer system that serves as a server or a client in this type of case. The above program may realize part of the functions described above, and it may also be combined with a program that has already been recorded on a computer system to realize the above functions.

This application is based upon and claims the benefit of priority from Japanese patent application No. 2011-208521, filed Sep. 26, 2011, the disclosure of which is incorporated herein in its entirety by reference.

INDUSTRIAL APPLICABILITY

The present invention may be applied to an information processing device. According to the information processing device applied with the present invention, communication information that is obtained in a large amount can be appropriately memorized and managed.

REFERENCE SYMBOLS

100 Information processing device
110 Communication information collection unit
120 Life log information extraction unit
130 Life log information storage unit
140 Life log information management unit
150 Network
171 to 175 Unspecified user

The invention claimed is:

1. An information processing device for assisting generation of social communication, based on user communication information exchanged through a network, the information processing device comprising:
at least one memory storing instructions, and
at least one processor configured to execute the instructions to:
collect the communication information;
extract life log information from the collected communication information;
store the extracted life log information in a configuration capable of being searched at least on an individual user unit basis;
store the extracted life log information without distinguishing the life log information for individual users;
memorize scores of a plurality of indexes while associating the scores with the life log information, the indexes indicating degrees of contribution of the life log information to new social communication generation; and
manage the stored life log information, based on a combination of the scores of the indexes,
wherein the indexes include at least: a number of occurrences of the life log information; and an occurrence frequency of the life log information within a predetermined period,
wherein a coefficient for weighting is set for each of a plurality of social networking services (SNS), the coefficient being different for each SNS, and
wherein the at least one processor is further configured to execute the instructions to weight the number of occurrences of the life log information and the occurrence frequency of the life log information within the predetermined period, using the coefficient that corresponds to the SNS from which the life log information has been obtained.

2. The information processing device according to claim 1, wherein the life log information includes keyword information included in the communication information and user behavioral information.

3. The information processing device according to claim 2, wherein the user behavioral information includes positional information of the user.

4. The information processing device according to claim 1, wherein the indexes further include at least any one of: a last occurrence date of the life log information; a characteristic degree of the life log information; and a retention period of the life log information.

5. The information processing device according to claim 1,
wherein the indexes further include at least a characteristic degree of the life log information, and
wherein in a case where an occurrence frequency of the life log information included in entire collected communication information is smaller than a first threshold value, the at least one processor is further configured to execute the instructions to: set the characteristic degree of the life log information higher than that in a case where the occurrence frequency is higher than the first threshold value.

6. The information processing device according to claim 1,
wherein the indexes further include at least a characteristic degree of the life log information, and
wherein in a case where the life log information represents a season, the at least one processor is further configured to execute the instructions to: set the characteristic degree of the life log information higher than that in a case where no season is represented.

7. The information processing device according to claim 1, wherein the at least one processor is further configured to execute the instructions to: collect communication information from a plurality of social networking services.

8. The information processing device according to claim 1, wherein the at least one processor is further configured to execute the instructions to: extract life log information by means of text mining in a case where the communication information is text data.

9. The information processing device according to claim 1, wherein the at least one processor is further configured to execute the instructions to: generate initial scores of the indexes corresponding to the life log information when the extracted life log information is stored.

10. The information processing device according to claim 1, wherein the at least one processor is further configured to execute the instructions to: update the scores of the indexes.

11. The information processing device according to claim 1, wherein the at least one processor is further configured to execute the instructions to: delete the life log information based on the scores of the indexes when predetermined conditions are met, in order to reduce memory volume of the life log information.

12. The information processing device according to claim 11, wherein the predetermined conditions include at least one of: a case where the number of stored life log information of respective users exceeds a second threshold value; a case where the number of all stored life log information exceeds a third threshold value; a case where an amount of stored life log information data exceeds a fourth threshold value; and a case where an amount of time taken by a process performed by the information processing device on the stored life log information exceeds a fifth threshold value.

13. The information processing device according to claim 11, wherein the at least one processor is further configured to execute the instructions to: weight and combine each one of the indexes, and delete the life log information with a combined score lower than a threshold value.

14. The information processing device according to claim 11, wherein the at least one processor is further configured to execute the instructions to: delete the life log information, based on, as the indexes, at least one of a last occurrence date of the life log information and a characteristic degree of the life log information.

15. The information processing device according to claim 14, wherein in a case where an occurrence frequency of the life log information included in entire collected communication information is smaller than a first threshold value, the at least one processor is further configured to execute the instructions to: set a characteristic degree of the life log information higher than that in a case where the occurrence frequency is higher than the first threshold value.

16. The information processing device according to claim 14, wherein in a case where the life log information represents a season, the at least one processor is further configured to execute the instructions to: set a characteristic degree of the life log information higher than that in a case where no season is represented.

17. The information processing device according to claim 1, where the at least one processor is further configured to execute the instructions to: select social communication information to be provided to a predetermined user, using the stored life log information and the scores of the indexes, and transmit the selected social communication information to a communication terminal being used by the predetermined user.

18. The information processing device according to claim 17, wherein the at least one processor is further configured to execute the instructions to: generate, as the social communication information, guidance information or advertising information capable of obtaining a preference of a user, based on a response of the user to the social communication information.

19. The information processing device according to claim 18, wherein the guidance information or the advertising information includes life log information capable of obtaining a preference of the user.

20. The information processing device according to claim 17, further comprising:
the at least one processor is further configured to execute the instructions to: receive a response of the user to the transmitted social communication information, and analyze a reaction of the user based on the response.

21. The information processing device according to claim 1, further comprising:
the at least one processor is further configured to execute the instructions to: update scores to be given to the indexes, based on a degree of contribution of each piece of life log information regarding establishment of social communication.

22. An information processing system comprising:
the information processing device according to claim 1; and
a communication terminal for transmitting the communication information to the information processing device, the communication terminal comprising:
at least one memory storing instructions, and
at least one processor configured to execute the instructions to:
sort in chronological order communication information exchanged through a plurality of social networking services, and create single timeline information; and
retain the communication information of a predetermined period to be transmitted to the information processing device.

23. A control method of an information processing device for assisting generation of social communication, based on user communication information exchanged through a network, the control method comprising:
collecting the communication information;
extracting life log information from the collected communication information;
storing the extracted life log information in a configuration capable of being searched at least on an individual user unit basis;
further storing the extracted life log information without distinguishing the life log information for individual users;
memorizing scores of a plurality of indexes while associating the scores with the life log information, the indexes indicating degrees of contribution of the life log information to new social communication generation; and
managing the stored life log information, based on a combination of the scores of the indexes,
wherein the indexes include at least: a number of occurrences of the life log information; and an occurrence frequency of the life log information within a predetermined period,
wherein a coefficient for weighting is set for each of a plurality of social networking services (SNS), the coefficient being different for each SNS, and
weighting the number of occurrences of the life log information and the occurrence frequency of the life log information within the predetermined period, using the coefficient that corresponds to the SNS from which the life log information has been obtained.

24. A control method comprising:
the control method of an information processing device according to claim 23; and
a control method of a communication terminal for transmitting the communication information to the information processing device, the control method of a communication terminal comprising:
sorting in chronological order communication information exchanged through a plurality of social networking services, and creating single timeline information; and
retaining the communication information of a predetermined period to be transmitted to the information processing device.

25. A non-transitory computer-readable recording medium storing a control program of an information processing device for assisting generation of social communication, based on user communication information exchanged through a network, the control program causing a computer to execute:
collecting the communication information;
extracting life log information from the collected communication information;
storing the extracted life log information in a configuration capable of being searched at least on an individual user unit basis;
further storing the extracted life log information without distinguishing the life log information for individual users;
memorizing scores of a plurality of indexes while associating the scores with the life log information, the indexes indicating degrees of contribution of the life log information to new social communication generation; and
managing the stored life log information, based on a combination of the scores of the indexes,
wherein the indexes include at least: a number of occurrences of the life log information; and an occurrence frequency of the life log information within a predetermined period,
wherein a coefficient for weighting is set for each of a plurality of social networking services (SNS), the coefficient being different for each SNS, and
weighting the number of occurrences of the life log information and the occurrence frequency of the life log information within the predetermined period, using the coefficient that corresponds to the SNS from which the life log information has been obtained.

26. The non-transitory computer-readable recording medium according to claim 25, the recording medium further storing a control program of a communication terminal for transmitting the communication information to the information processing device, the control program causing a computer to execute:
sorting in chronological order communication information exchanged through a plurality of social networking services, and creating single timeline information; and
retaining the communication information of a predetermined period to be transmitted to the information processing device.

27. An information processing system for assisting generation of social communication, based on user communication information exchanged through a network, the information processing system comprising:
at least one memory storing instructions, and
at least one processor configured to execute the instructions to:
collect the communication information;
extract life log information from the collected communication information;
store the extracted life log information in a configuration capable of being searched at least on an individual user unit basis;
store the extracted life log information without distinguishing the life log information for individual users;
memorize scores of a plurality of indexes while associating the scores with the life log information, the indexes indicating degrees of contribution of the life log information to new social communication generation;
manage the stored life log information, based on a combination of the scores of the indexes; and
select guidance information or advertising information to be provided to a predetermined user, using the stored life log information and the scores of the indexes, and provide the selected guidance information or advertising information through a communication terminal being used by the predetermined user,
wherein the indexes include at least: a number of occurrences of the life log information; and an occurrence frequency of the life log information within a predetermined period,
wherein a coefficient for weighting is set for each of a plurality of social networking services (SNS), the coefficient being different for each SNS, and
weighting the number of occurrences of the life log information and the occurrence frequency of the life log information within the predetermined period, using the coefficient that corresponds to the SNS from which the life log information has been obtained.

28. An information processing method for assisting generation of social communication, based on user communication information exchanged through a network, the information processing method comprising:
collecting the communication information;
extracting life log information from the collected communication information;
storing the extracted life log information in a configuration capable of being searched at least on an individual user unit basis;
further storing the extracted life log information without distinguishing the life log information for individual users;
memorizing scores of a plurality of indexes while associating the scores with the life log information, the indexes indicating degrees of contribution of the life log information to new social communication generation;
managing the stored life log information, based on a combination of the scores of the indexes; and
selecting guidance information or advertising information to be provided to a predetermined user, using the stored life log information and the scores of the indexes, and providing the selected guidance information or advertising information through a communication terminal being used by the predetermined user,
wherein the indexes include at least: a number of occurrences of the life log information; and an occurrence frequency of the life log information within a predetermined period,
wherein a coefficient for weighting is set for each of a plurality of social networking services (SNS), the coefficient being different for each SNS, and
weighting the number of occurrences of the life log information and the occurrence frequency of the life log information within the predetermined period, using the coefficient that corresponds to the SNS from which the life log information has been obtained.

* * * * *